(12) United States Patent
Kanno et al.

(10) Patent No.: US 6,504,628 B1
(45) Date of Patent: *Jan. 7, 2003

(54) COLOR IMAGE-FORMING APPARATUS CAPABLE OF DISCRIMINATING THE COLORS OF THE ORIGINAL IMAGE

(75) Inventors: Hiroki Kanno, Yokohama (JP); Takayuki Sawada, Tokyo (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/086,938

(22) Filed: May 29, 1998

(30) Foreign Application Priority Data

May 29, 1997 (JP) .............................. 9-140215

(51) Int. Cl.[7] ................................................ G03F 3/08
(52) U.S. Cl. ........................ 358/522; 358/515; 382/168
(58) Field of Search ............................... 358/522, 515, 358/1.9, 500, 501, 505, 517, 518; 382/168, 165, 171, 173, 176

(56) References Cited

U.S. PATENT DOCUMENTS

| | | | | |
|---|---|---|---|---|
| 4,703,318 A | * | 10/1987 | Haggerty | 358/298 |
| 5,287,204 A | * | 2/1994 | Koizumi et al. | 358/538 |
| 5,289,296 A | * | 2/1994 | Yamada | 358/530 |
| 5,420,938 A | | 5/1995 | Funada et al. | 382/173 |
| 5,576,849 A | * | 11/1996 | Murakami et al. | 358/450 |
| 5,724,440 A | * | 3/1998 | Funada et al. | 382/162 |
| 5,786,906 A | * | 7/1998 | Shishizuka | 358/500 |
| 5,848,185 A | * | 12/1998 | Koga et al. | 382/173 |
| 6,118,895 A | * | 9/2000 | Hirota et al. | 382/165 |

FOREIGN PATENT DOCUMENTS

| | | |
|---|---|---|
| EP | 0 448 330 | 9/1991 |
| JP | 60-104967 | 6/1985 |

* cited by examiner

Primary Examiner—Mark Wallerson
(74) Attorney, Agent, or Firm—Foley & Lardner

(57) ABSTRACT

An image forming apparatus comprising a scanner for reading an original and outputting image data for the original including color information and an image forming mechanism for forming an image either in black and white or in color according to the color information contained in the image data.

7 Claims, 22 Drawing Sheets

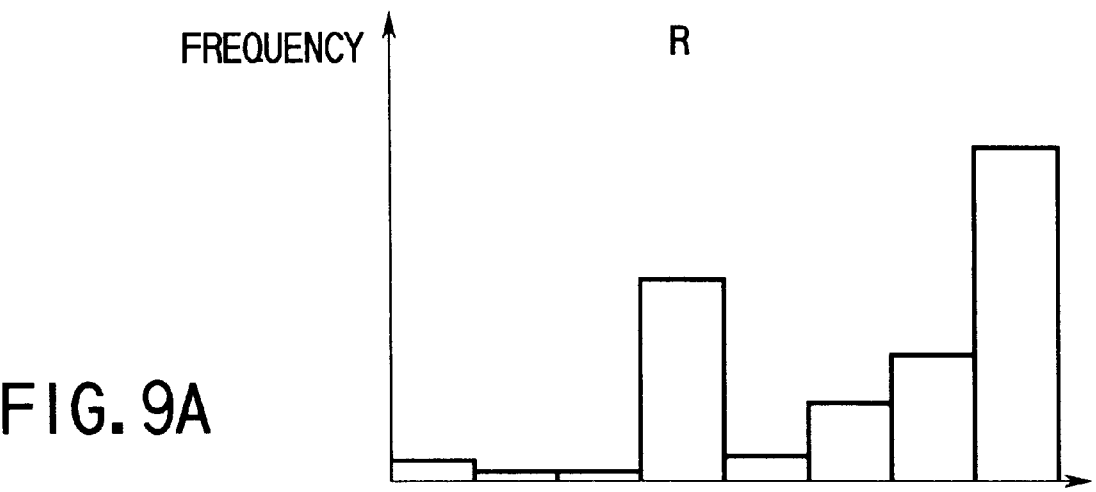

COLOR IMAGE-FORMING APPARATUS CAPABLE OF DISCRIMINATING THE COLORS OF THE ORIGINAL IMAGE

BACKGROUND OF THE INVENTION

This invention relates to an image forming apparatus such as a digital color copying apparatus for copying a color picture and also to an image processing apparatus for processing a color image picked up from a picture by such an image forming apparatus.

Generally, the operation of copying an original by means of a copying machine falls in one of the three categories listed below.

(1) The original is in black and white and the copy is required to be also in black and white.

(2) The original is in color and the copy is required to be in black and white.

(3) The original is in color and the copy is required to be also in color.

With known color copying apparatus, the user trying to carry out an operation of copying the original in any of the above three categories either (1) copies the original in color regardless of the type of the original or (2) selects a color copying mode or a in black and white copying mode depending on the type of the original.

If the original comes in the form of a single sheet or a few number of sheets, the user may select a color mode or a monochrome mode for each sheet without any trouble. When the original has a large number of sheets and an automatic draft feeder (ADF) is employed for feeding them, either a color mode or a monochrome mode will be selected for copying if the original contains both color and monochromatic pictures. Thus, it is difficult to select properly a color mode or a monochrome mode for each sheet if the original contains both color and monochromatic pictures.

A color copying machine that can automatically select a color mode has recently been proposed. A color copying machine of this type is provided with a pre-scanning feature of analyzing the chromatic distribution of each sheet of the original to determine if the picture of sheet is in black and white or in color and selecting either a color mode or a monochrome mode for copying the sheet depending on the outcome of the analysis.

Thus, with a color copying machine having such a feature, it is not difficult to select properly a color mode or monochrome mode for each sheet of the original when the original has a large number of sheets and contains both color and monochromatic pictures and an ADF is employed for copying.

As described above, a color copying machine having an automatic color/monochrome mode selection feature pre-scans each of the sheets of the original before actually copying it in order to analyze its chromatic distribution and determine if it is in black and white or in color before it selects a color mode or a monochrome mode for copying it. Thus, such a machine can cope with an original comprising a large number of sheets that are fed by an ADF if the original contains both color monochromatic pictures.

However, the feature of automatically selecting a color mode or a monochrome mode is adapted to discriminate between a picture in color and a picture in black and white and the result of the discrimination may not necessarily agree with the intention of the user who may want to obtain a monochromatic copy of a color picture.

For example, a faintly colored sheet carrying thereon characters written with black ink (with a black pencil) that provides a color original will also be determined to be so by a color copying machine having an automatic mode selection feature, whereas the user will more often than not want a monochromatic copy out of it.

Handbills and leaflets are often prepared by printing letters with black ink on colored sheets of paper in order to obtain an esthetic effect at reduced cost. When such a printed sheet of paper is copied, it will be done so mostly to copy the message on the sheet and the color of the sheet will not have any significance to the person who wants the copy.

In short, whether the user selects a color mode or a monochrome mode is not simply dependent on if the original is in color or in black and white.

While the prior art is discussed above from the viewpoint of the operation by the user of an image forming apparatus who is copying the original, it will also have to be discussed from the viewpoint of the rate of ink consumption.

If a page of a faintly colored note book carrying thereon characters written with black ink (with a black pencil) is copied in color, a large volume of coloring matter will have to be consumed for copying the colored background that occupies most of the surface area relative to the area occupied by the black characters on the page.

Likewise, a large volume of coloring matter will have to be consumed for copying the background of a handbill or a leaflet that is colored. The consumption of the costly coloring matter will be avoided if they are copied in black and white.

Therefore, there is a demand for a color copying apparatus having an automatic color/monochrome mode section feature that is adapted to occasions as described above.

BRIEF SUMMARY OF THE INVENTION

Therefore, it is an object of the present invention to provide an image forming apparatus that can copy an original by automatically selecting a color mode or a monochrome mode for each sheet of the original if the latter contain pictures in color and those in black and white as well as an image processing apparatus for processing an image picked up by such an image forming apparatus.

Another object of the invention is to provide an image forming apparatus that can automatically select a color mode or a monochrome mode according to a set of preselected conditions for copying an original without simply depending on if the original is in color or in black and white as well as an image processing apparatus for processing an image picked up by such an image forming apparatus.

Still another object of the invention is to provide an image forming apparatus that can produce a black and white copy from an original of a colored sheet carrying thereon characters printed with black ink at low cost as well as an image processing apparatus for processing an image picked up by such an image forming apparatus.

According to an aspect of the invention, the above objects and other objects are achieved by providing an image forming apparatus comprising a reading means for reading an original and outputting image data including color information for the original and an image forming means for determining an image to be formed either in black and white or in color according to the color information of the image data and forming an image from the image data according to the determination (Embodiments 1 through 5; FIGS. 4, 14, 16, 20, 22).

With the above described arrangement, an image forming apparatus according to the invention does not simply produce a black and white copy out of a black and white original sheet or a color copy out of a color original sheet but optimally selects a color mode or a monochrome mode for the original sheet or each of the original sheets according to a predetermined rule so that, for example, a black and white image will be produced out of a color original sheet carrying thereon monochromatic characters printed on a colored background.

According to another aspect of the invention, there is provided an image forming apparatus comprising a reading means for reading an original and outputting image data including color information for the original, a determining means for determining a region for the image data output from the reading means and an image forming means for determining an image to be formed either in black and white or in color according to the color information of the image data and the region determined by the determining means and forming an image from the image data according to the determination (Embodiments 6 through 8; FIGS. 24, 28, 30).

With the above described arrangement, an image forming apparatus according to the invention determines a region according to the color information of the original sheet or each of the original sheets and an image to be formed either in black and white or in color according to the color information and the region so that it selects a color mode or a monochrome mode more reliably.

More specifically, for copying an original sheet by means of an image forming apparatus according to the invention, it determines if the original is to be copied in color or in black and white by pre scanning the original and analyzing its chromatic distribution and then automatically selects a color mode or a monochrome mode according to the determination before it produces a copy of the original. Thus, an image forming apparatus according to the invention can cope with an original comprising a large number of sheets that are fed by an ADF if the original contains both color monochromatic pictures.

Additionally, an image forming apparatus according to the invention is free from the above pointed out problem of a known image forming apparatus having the feature of automatically selecting a color mode or a monochrome mode that the result of the discrimination made by the apparatus between a picture in color and a picture in black and white for the original to be copied may not necessarily agree with the intention of the user who may want to obtain a monochromatic copy of a color picture.

For example, a faintly colored sheet carrying thereon characters written with black ink (with a black pencil) may be copied in black and white, if the user wants so, by preselecting an appropriate set of conditions.

Handbills and leaflets prepared by printing letters with black ink on colored sheets of paper may also be copied in black and white.

In other words, an image forming apparatus according to the invention automatically selects a color mode or a monochrome mode according to a set of conditions preselected by the user regardless if the original sheet to be copied is in color or in black and white.

Thus, with an image forming apparatus according to the invention, faintly colored sheets carrying thereon characters written with black ink (with a black pencil) and handbills and leaflets prepared by printing letters with black ink on colored sheets of paper may be copied in black and white to suppress the consumption of costly coloring matters and hence the total cost of producing copies.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 9A, 9B and 9C show still other exemplary histograms that can also be used for the purpose of the invention.

DETAILED DESCRIPTION OF THE INVENTION

Now, the present invention will be described by referring to the accompanying drawings that illustrate preferred embodiments of the invention.

Figure 1:
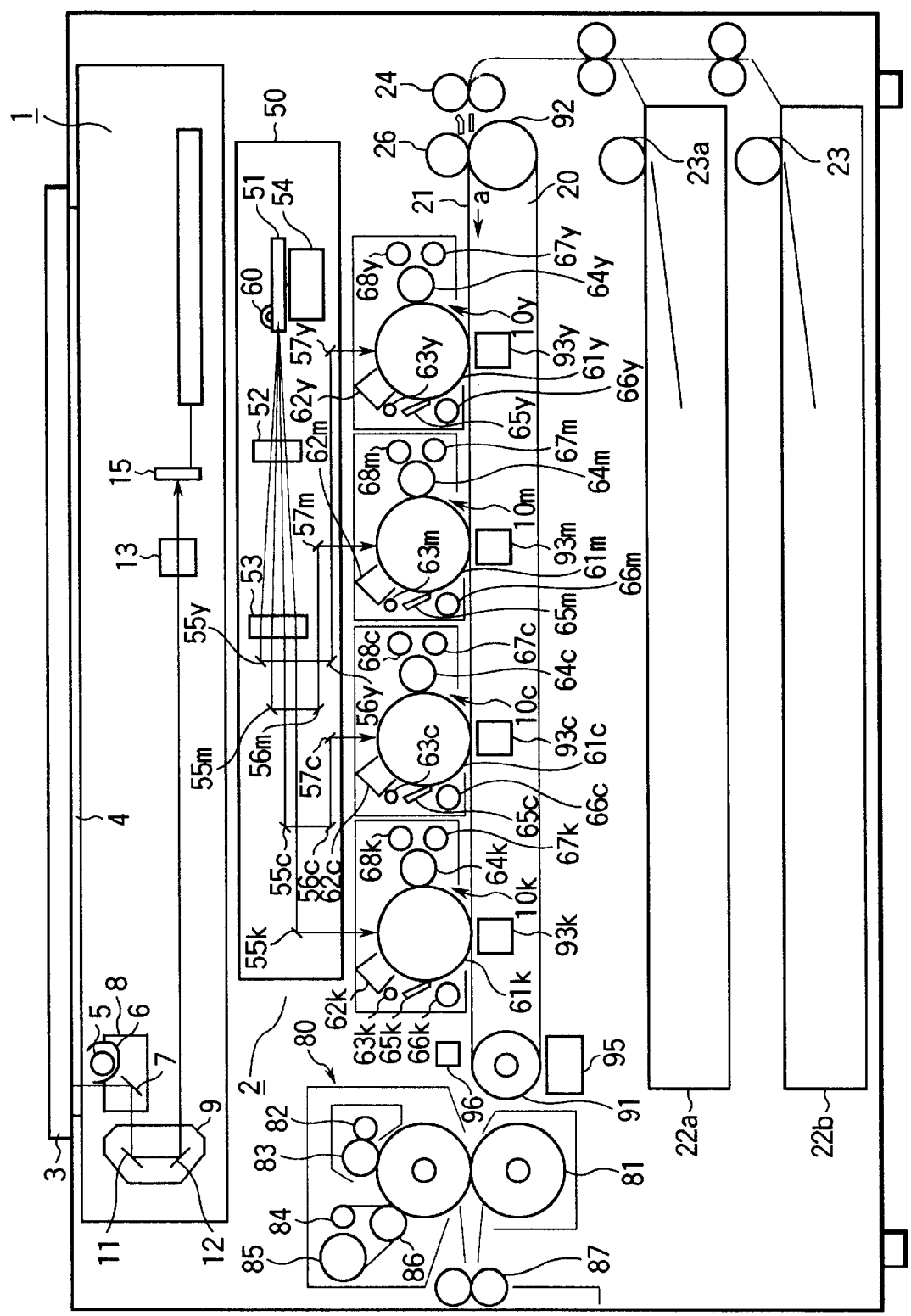
FIG. 1 is a side view of a first embodiment of image forming apparatus according to the invention, schematically showing the inside.

FIG. 1 is a side view of a first embodiment of image forming apparatus according to the invention which may be a digital color copying machine, schematically showing the inside. Grossly, the image forming apparatus comprises a color scanner section 1 operating as image reading means for reading the color images of the original and a color printer section 2 operating as image forming means for producing a facsimile image of the color image read by the color printer.

The color scanner section 1 in turn comprises an original table cover 3 in an upper portion thereof and an original table 4 of a transparent glass plate located vis-a-vis original table cover 3 in a closed condition to carry thereon an original. Below the original table 4, there are provided an exposure lamp 5 for illuminating the original placed on the original table 4, a reflector 6 for focusing the light from the exposure lamp 5 onto the original and a first mirror 7 for deflecting the light reflected by the original leftwardly in FIG. 1. The exposure lamp 5, the reflector 6 and the first mirror 7 are rigidly secured to a first carriage 8. The first carriage 8 is adapted to move along the lower surface of the original table 4 as it is driven by a pulse motor (not shown) by way of a toothed belt (not shown).

A second carriage 9 is arranged to the left of the first carriage 8 in FIG. 1 and along the optical path for guiding the light reflected by the first mirror 7 and adapted to be driven by a drive mechanism (not shown but including a toothed belt and a DC motor) to move in parallel with the original table 4. The second carriage 9 is provided with a second mirror 11 for deflecting the light reflected by the original and guided by the first mirror 7 downwardly in FIG. 1 and a third mirror 12 for deflecting the light reflected by the second mirror 11 rightwardly in FIG. 1, said second and third mirrors 11 and 12 being arranged rectangularly relative to each other. The second carriage 9 is adapted to be driven by the first carriage 8 and move in parallel with the original table 4 at a rate equal to a half of the moving rate of the first carriage 8.

A focusing lens 13 is arranged in a plane containing the optical axis of the light reflected by the second and third mirrors 11, 12 in order to produce an image for the light reflected by the third mirror 12 with a predetermined magnification. A CCD type color image sensor (photoelectric transducer) 15 is arranged in a plane substantially perpendicular to the optical axis of the light coming out of the focusing lens 13 in order to transform the light converged by the focusing lens 13 into an electric signal.

Thus, as the light emitted from the exposure lamp 5 is focused on the original table 4 by means of the reflector 6, the light reflected by the original enters the color image sensor 15 by way of the first mirror 7, the second mirror 11, the third mirror 12 and the focusing lens 13, where the incident light is transformed into an electric signal defined by the intensities of the three primary colors of red (R), green (G) and blue (B).

The color printer section 2 comprises first through fourth image forming sections 10y, 10m, 10c and 10k for producing four color images of yellow (y), magenta (m), cyan (c) and black (b) by means of a known subtractive color mixing technique.

A conveyor mechanism 20 is arranged below the four image forming sections 10y, 10m 10c and 10k in order to move the images of the four colors produced by the image forming sections in a direction indicated by arrow a in FIG. 1 and includes a conveyor belt 21. The conveyor belt 21 is an endless belt driven to circulate in the direction of arrow a between a driving roller 91 and a driven roller 92 separated by a predetermined distance from each other. Note that the image forming sections 10y, 10m, 10c and 10k are arranged serially along the moving direction of the conveyor belt 21. The image forming sections 10y, 10m, 10c and 10k comprises respective photosensitive drums 61y, 61m, 61c and 61k located at respective positions tangential relative to the conveyor belt 21 so that they may be driven to rotate in the same direction, carrying respective images. The photosensitive drums 61y, 61m, 61c and 61k are driven to rotate at a predetermined peripheral velocity by a motor (not shown).

The photosensitive drums 61y, 61m, 61c and 61k have respective axes arranged at regular intervals perpendicularly relative to the direction along which images are transferred by the conveyor belt 21. Note that, in the following description, the direction of the axes of the photosensitive drums 61y, 61m, 61c and 61k is referred to as the principal scanning direction (second direction), whereas the rotational direction of the photosensitive drums 61y, 61m, 61c and 61k and hence that of the conveyor belt 21 (or the direction of arrow a in FIG. 1) is referred to as the auxiliary scanning direction (first direction).

Charging devices 62y, 62m, 62c and 62k and discharging devices 63y, 63m, 63c and 63k are arranged respectively close to the photosensitive drums 61y, 61m , 61c and 61k and extend in the principal scanning direction in order to electrically charge and discharge the respective photosensitive drums 61y, 61m, 61c and 61k. Additionally, developing rollers 64y, 64m, 64c and 64k for developing images, lower agitation rollers 67y, 67m, 67c and 67k, upper agitation rollers 68y, 68m, 68c and 68k, image transfer devices 93y, 93m, 93c, 93k for transferring images, cleaning blades 65y, 65m, 65c and 65k and waste toner collection screws 66y, 66m, 66c and 66k are also arranged respectively close to the photosensitive drums 61y, 61m, 61c and 61k and mostly extend in the principal scanning direction.

The transfer devices 93y, 93m, 93c, 93k are located so as to pinch the conveyor belt 21 with the respective photosensitive drums 61y, 61m, 61c and 61k. In other words, they are located inside the conveyor belt 21. Exposure spots of exposure unit 50 which will be described hereinafter are located on the outer peripheries of the photosensitive drums 61y, 61m, 61c and 61k between the charging devices 62y, 62m, 62c and 62k and the corresponding developing rollers 64y, 64m, 64c and 64k respectively.

Sheet cassettes 22a and 22b are arranged below the conveyor mechanism 20 and contain a large number of sheets of papers P as so many image carrying media onto which images produced by the image forming sections 10y, 10m, 10c and 10k are to be transferred.

Each of the sheet cassettes 22a and 22b is provided at an end thereof located close to the driven roller 92 with a pick up rollers 23a or 23b, whichever appropriate, for taking the top one of the sheets contained in it. Register rollers 24 are arranged between the pick up rollers 23a and 23b and the driven roller 92 in order to align the front end of the sheet picked up from the sheet cassette 22a or 22b and that of the y-toner image formed on the photosensitive drum 61y of the image forming section 10y.

The toner images on the remaining photosensitive drums 61m, 61c and 61k are fed to the respective transfer positions at respective timings matched to the arrival of the sheet P being conveyed by the conveyor belt 21.

An adsorption roller 26 is arranged between the register rollers and the first image forming section 10y and vis-a-vis the driven roller 92 to substantially pinch the conveyor belt 21 and provide the sheet P being conveyed from the sheet cassette 22a or 22b by way of the register rollers 24 with electrostatic adsorbing force. Note that the axis of the adsorption roller 26 is held in parallel with that of the driven roller 92.

A displacement sensor 96 is arranged near the driving roller 91 with the conveyor belt 21 disposed therebetween for detecting any displacement of the image on the conveyor belt 21. The displacement sensor 96 is typically a transmission type or reflection type photosensor.

A conveyor belt cleaning device 95 is arranged near the driving roller 91 at a position downstream relative to the displacement roller 96 for removing any toner and/or paper debris adhering to the conveyor belt 21.

A fixing unit 80 is arranged on the path along which the sheet P conveyed by the conveyor belt 21 and leaving the driving roller 91 further proceeds for melting and fixing the toner image that has been transferred onto the sheet P by heating the sheet P to a predetermined temperature level. The fixing unit 80 comprises a pair of heat rollers 81, oil applying rollers 82 and 83, a web take-up roller 84, a web roller 85 and a web pressing roller 86. The image formed on the sheet P is fixed before the sheet is ejected from a pair of sheet delivery rollers 87.

The exposure unit 50 for forming a color separated electrostatic latent image on the outer peripheral surface of each of the photosensitive drums 61y, 61m , 61c and 61k comprises a semiconductor laser oscillator 60 controlled for light emission according to image data for the four colors (Y, M, C and K) by an image processing apparatus 36 which will be described hereinafter. A polygon mirror 51 driven to rotate by a polygon motor to reflect the laser beam for scanning and fθ lenses 52 and 53 for correcting the focal point of the reflected laser beam and focusing it are arranged sequentially along the light path of the semiconductor laser oscillator 60.

First deflector mirrors 55y, 551m, 55c and 55k for deflecting the laser beams of the four colors after passing the lens 53 respectively to the exposure spots of the photosensitive drums 61y, 61m, 61c and 61k and second and third deflector mirrors 56y, 56m, 56c, 57y, 57m and 57c for deflecting further the laser beams coming from the first deflector mirrors 55y, 55m, 55c are arranged between the fθ lens 53 and the respective photosensitive drums 61y, 61m, 61c and 61k.

Note that, after being deflected by the first deflector mirror 55k, the laser beam for black is guided onto the photosensitive drum 61k directly without passing by an other mirrors.

Figure 2:
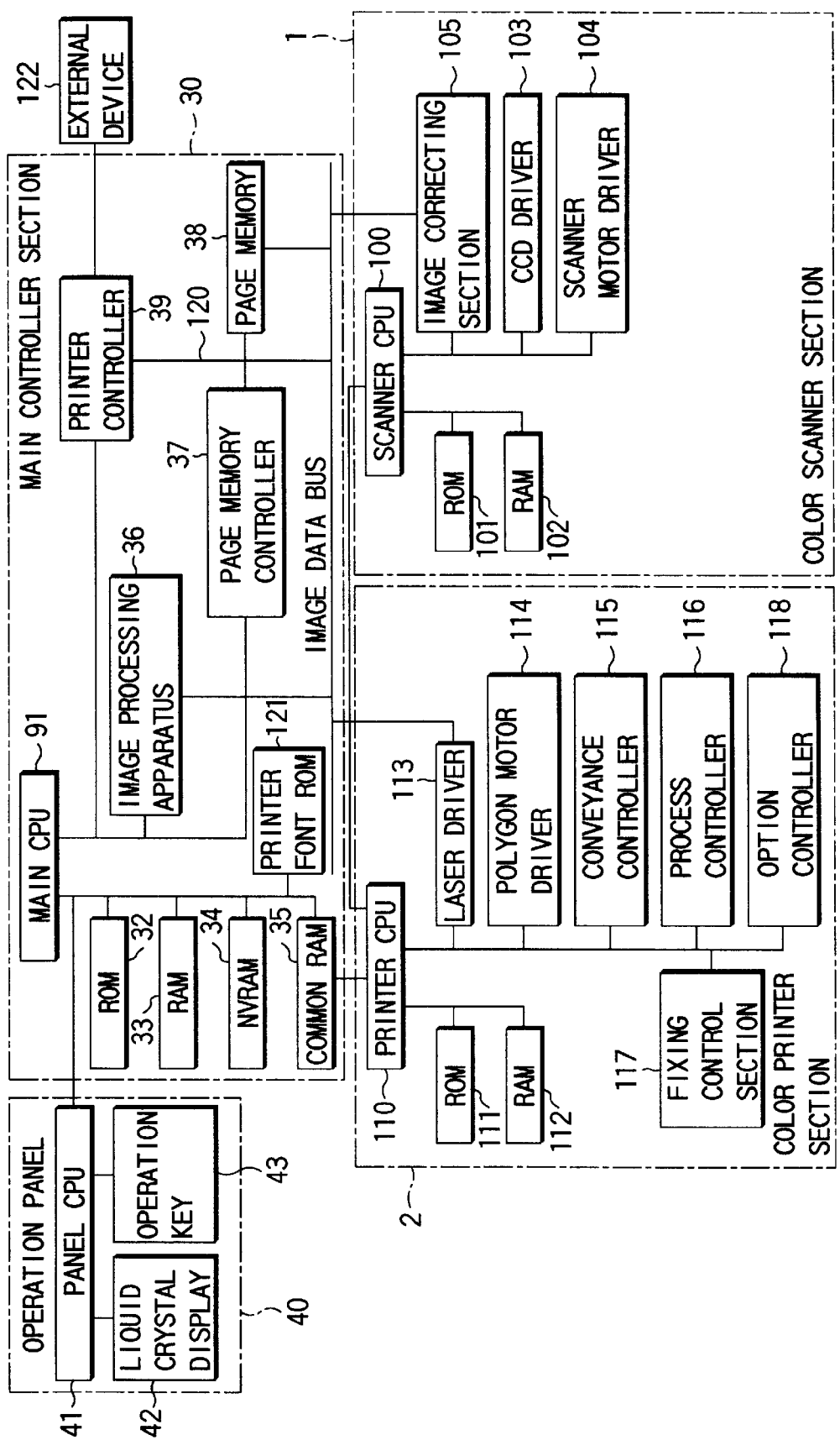
FIG. 2 is a schematic block diagram of the image forming apparatus of FIG. 1, showing the electric interconnection and the flow of signals for controlling the operation of the apparatus.

FIG. 2 is a schematic block diagram of the image forming apparatus of FIG. 1, showing the electric interconnection and the flow of signals for controlling the operation of the apparatus. Referring to FIG. 2, the control system of the apparatus comprises three CPUs including a main CPU (central processing unit) in the main controller section 30, a scanner CPU 100 in the color scanner section 1 and a printer CPU 110 in the color printer section 2.

The main CPU 91 bidirectionally communicates with the printer CPU 110 by way of a common RAM (random access memory) 35 such that the main CPU 91 issues an operation command and the printer CPU 110 reports the current status. The printer CPU 110 and the scanner CPU 100 communicates serially such that the printer issues an operation command and the scanner CPU 100 reports the current status.

Operation panel 40 comprises a liquid crystal display 42, operational keys 42 and a panel CPU 41 interconnecting the remaining components of the operation panel 40 and connected to the main CPU 91.

The main controller section 30 comprises a main CPU 91, a ROM (read only memory) 32, a RAM 33, an NVRAM 34, a common RAM 35, an image processing apparatus 36, a page memory controller 37, a page memory 38, a printer controller 39 and a printer font ROM 121.

The main CPU 91 controls the overall operation of the image forming apparatus. The ROM 32 stores control programs among others. The RAM 33 temporarily stores data.

The NVRAM (nonvolatile RAM 34) is a nonvolatile memory backed up by a battery (not shown) so that it maintains the data it stores if it is cut isolated from the power supply.

The common RAM 35 is used for bidirectional communication between the main CPU 91 and the printer CPU110.

The page memory controller 37 stores image data in the page memory 38 and reads image date from the latter. The page memory 38 has a memory capacity for storing image date for a plurality of pages and is adapted to store compressed image data coming from the color scanner section 1 on a page by page basis.

The printer font ROM 121 stores font data corresponding to printing data. The printer controller 39 develops image data out of the printing data fed from an external device 122, which may be a personal computer, with the level of resolution defined by the resolution data contained in the printing data, using the font data stored in the printer font ROM 121.

The color scanner section 1 comprises a scanner CPU 100 for controlling the overall operation of the section, a ROM 101 for storing control programs among others, a RAM 102 for storing data, a CCD driver 103 for driving the color image sensor 15, a scanner motor driver 104 for controlling the rotation of the scan motor adapted to drive the first carriage 8 and an image correcting section 105.

The image correcting section 105 by turn comprises an A/D converter circuit for transforming R, G, B analog signals output from the color image sensor 15 into digital signals, a shading correcting circuit for correcting the fluctuations in the threshold level for output signals from the color image sensor due to fluctuations in the ambient temperature and a line memory for temporarily storing the digital signals corrected for shading by the shading correcting circuit.

The color printer section 2 comprises a printer CPU 110 for controlling the overall operation of the section, a ROM 111 for storing control programs among others, a RAM for storing data, a laser driver for driving the semiconductor laser oscillator 60, a polygon driver 114 for driving the polygon motor 54 of the exposure unit 50, a conveyance controller 115 for controlling the operation of conveying sheets P of the conveyor mechanism, a process controller 116 for controlling the electrically charging process using the charging devices, the image developing process using the developing rollers and the image transferring process using the image transfer devices, a fixing controller 117 for controlling the operation of the fixing unit 80 and an option controller 118 for controlling operational options.

The image processing apparatus 36, the page memory 38, the printer controller 39, the image correcting section 105 and the laser driver 113 are connected by means of an image data bus 120.

Figure 3:
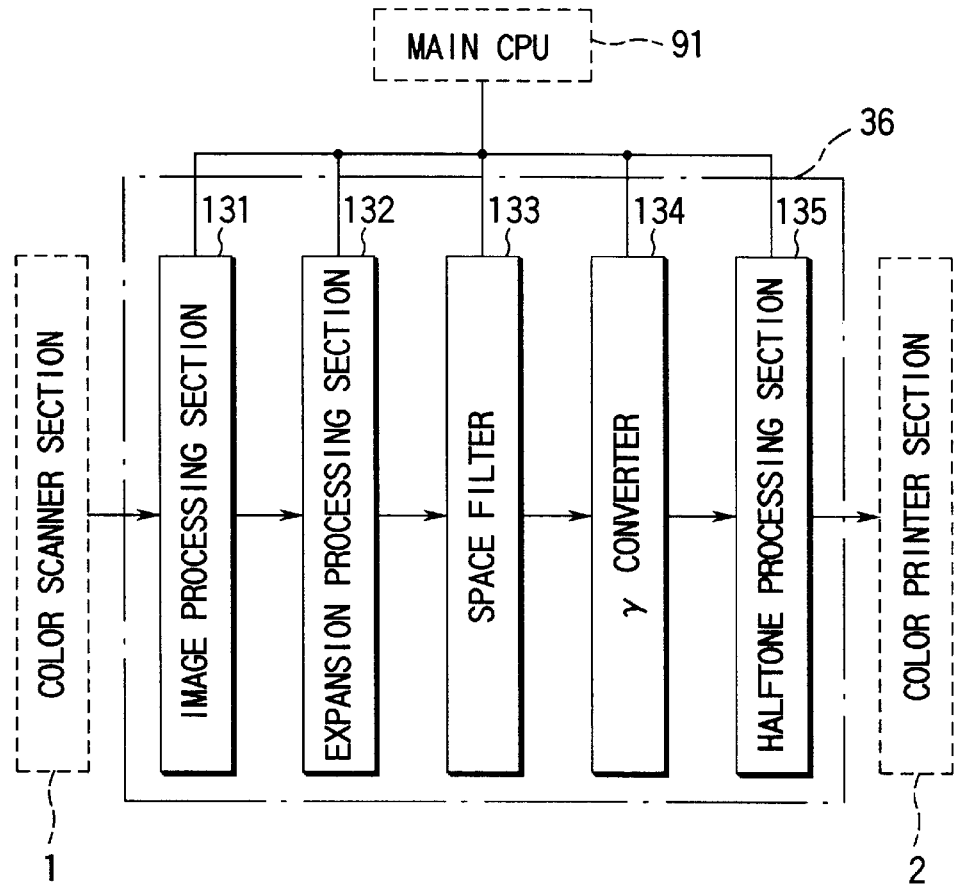
FIG. 3 is an simplified schematic block diagram of an image processing apparatus according to the invention.

FIG. 3 is an simplified schematic block diagram of the image processing apparatus 36. Referring to FIG. 3, the image data R, G and B output from the color scanner section 1 are fed to the image processing section 131. As will be described in greater detail, the image processing section 131 provides the core of the present invention. It determines the chromatic distribution of the original on the basis of the image data R, G and B entered to it as color characteristic and then the type of the original (if it is in color or in black and white) on the basis of the extracted data. Then, it determines the color information (image data) it outputs according to the result of the above determination.

The image data output from the image processing section 131 are then fed to the color printer section 2 by way of an expansion processing section 132, a space filter 131 for conducting a processing operation using the space filter, a γ converter 134 and a half tone processing section 135.

Figure 4:
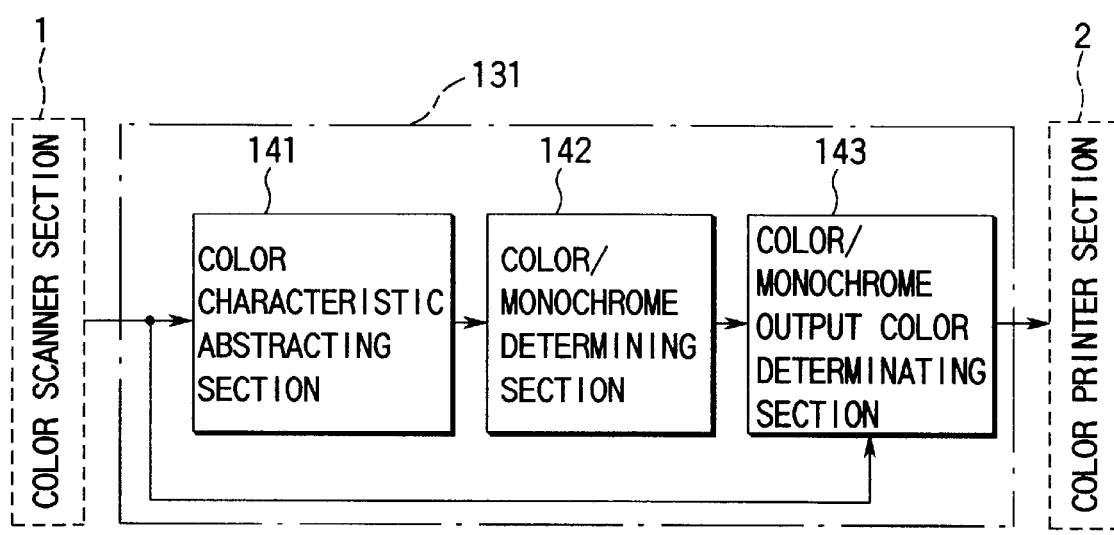
FIG. 4 is a schematic block diagram of the image processing section of the embodiment of FIG. 1.

FIG. 4 is a schematic block diagram of the image processing section of the first embodiment. For the purpose of simplification, the expansion processing section 132, the space filter 131, the γ converter 134 and the half tone processing section 135 will not be described here any further.

Referring to FIG. 4, the image data R, G and B output from the color scanner section 1 are then fed to the color characteristic abstracting section 141 that operates for extracting the color characteristics of the original. The color characteristic abstracting section 141 extracts the chromatic distribution of the original and typically comprises a multi-value generator section 151 as shown in FIG. 5 and a histogram preparing section 152 as shown in FIG. 6.

The multi-value generator section 151 conducts a multi-valuing operation by comparing the entered image data R, G and B with predetermined threshold values Th1 through Thn−1 and outputs multi-valued image signals Rg, Gg and Bg. As shown in FIG. 5, it comprises a threshold value memory 153 for storing a total of n−1 threshold values Th1 through Thn−1, a total of n−1 comparators 1541 through 154n−1 for respectively comparing the entered image data R (G, B) with the corresponding threshold values Th1 through Thn−1 stored in the threshold value memory 153 and an encoder 155 for coding of the outcome of the comparison of each of the comparators 1541 through 154n−1.

Figure 5:
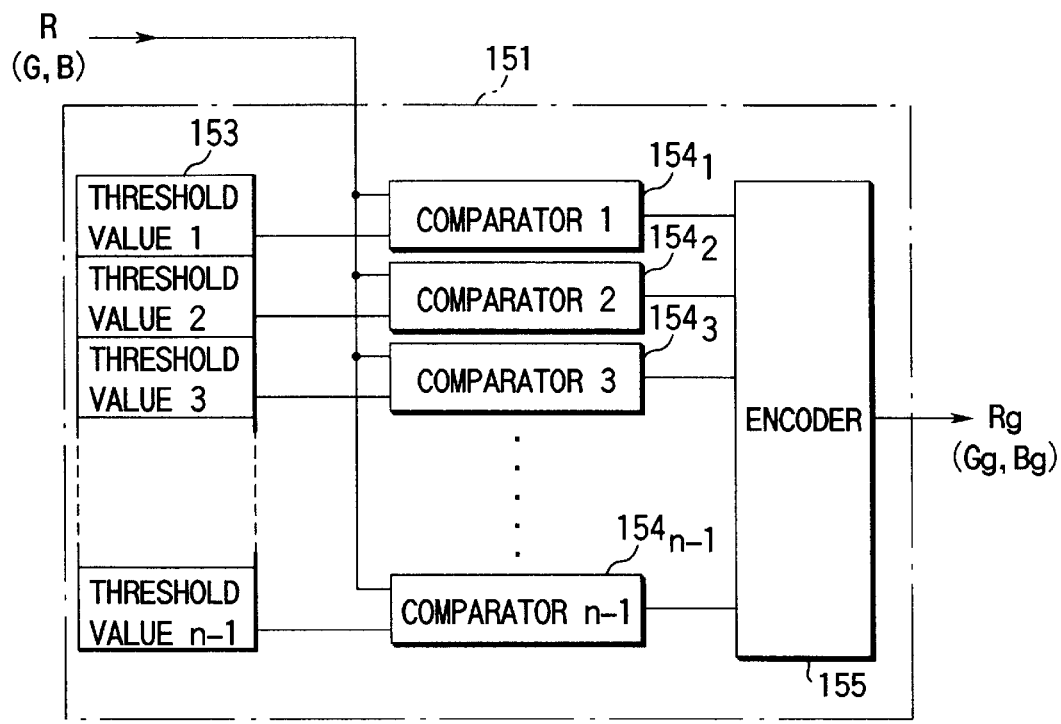
FIG. 5 is a schematic block diagram of the multi-value generator of the color characteristic abstracting section of the embodiment of FIG. 1.
Figure 6:
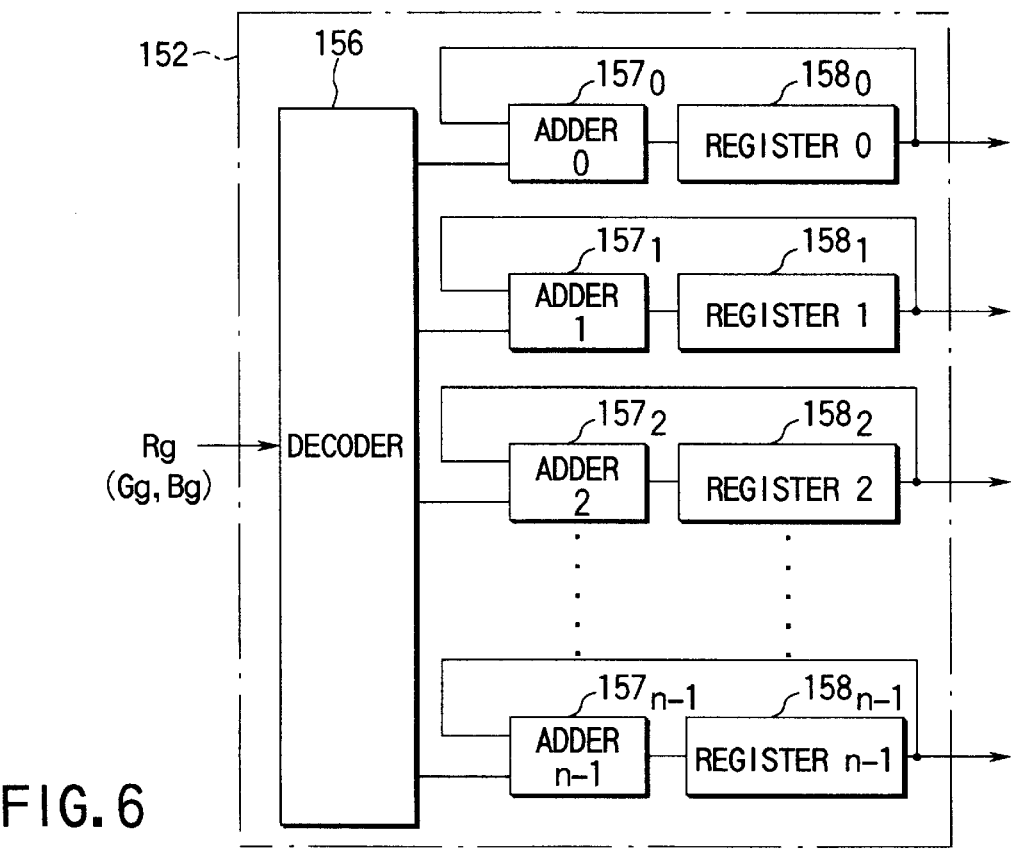
FIG. 6 is a schematic block diagram of the histogram generator of the color characteristic abstracting section of the embodiment of FIG. 1.

Note that, while FIG. 5 shows only the circuit for image data R, similar circuits are provided for image data G and R.

The operation of the multi-value generator section 151 will be discussed below, assuming that the number of multi-valuing levels is equal to n. Firstly, the entered image data R is compared with the threshold values Th1 through Thn−1 in the threshold memory 153 by the comparators 1541 through 154n−1 for multi-valuing so that a multi-valued image signal Rg is output from the multi-value generator section 151. More specifically, if the entered image data R is smaller than the threshold value Th1, the multi-value generator section 151 outputs "0" as multi-valued image signal Rg. If the image data is not smaller than the multi-value Th1, it is compared with the threshold value Th2 and, if it is smaller than the threshold value Th2, the multi-value generator section 151 outputs "1". Similarly, if the image data is not smaller than the threshold value Th2, it is compared with the threshold value Th3 and, if it is smaller than the threshold value Th3, the multi-value generator section 151 outputs "2" and so on until, if necessary, it is compared with the threshold value Thn−1. Thus, Rg=0: R<Th1,
Rg=1: R≧Th1 and R<Th2,
Rg=2: R≧Th2 and R<Th3,
Rg=3: R≧Th3 and R<Th4,
Rg=n−2: R≧Thn−1 and R<Thn or
Rg=n−1: R≧Thn.

Note that the operation for image data R is described above, a similar operation will be conducted for both image Data G and image data B to output multi-valued image signals Gg and Bg.

The histogram preparing section 152 is adapted to prepare histogram information on the basis of the multi-valued image signals Rg, Gg and Bg from the multi-value generator section 151. Referring to FIG. 6, it comprises a decoder 156 for decoding entered multi-valued image signal Rg (Gg, Bg), a total of n adders 1570 through 157n−1 and a total of n registers 1580 through 158n−1.

Note that, while FIG. 6 shows only the circuit for multi-valued image signal Rg, similar circuits are provided for multi-valued image signals Gg and Rg.

The operation of the histogram preparing section 152 will be discussed below. The registers 1580 through 158n−1 requires a capacity of 25 bits for receiving data for an A3-sized 400 dpi image. Each of the registers 1580 through 158n−1 is cleared to "0" and, when the multi-valued image signal Rg is equal to "0", the register 1580 is counted up to "1". Similarly, the register 1581 is counted up if the multi-valued image signal Rg is equal to "1" and the register 1582 is counted up if the multi-valued image signal is equal to "2". Note that the above operation is also conducted for each of the multi-valued image signals Gg and Bg so that histogram information is prepared in the registers 1580 through 158n−1.

The above operation will be repeated for each pixel until the entire image on a sheet is entered. Note that the frequencies for the image data (histogram information) accumulated in the registers 1580 (high density slot) through 158n−1 (low density slot) are RH(0) through RH(n−1) for image data R, GH(0) through GH(n−1) for image data G and BH(0) through BH(n−1) for image data B in the following description.

Figure 7A:
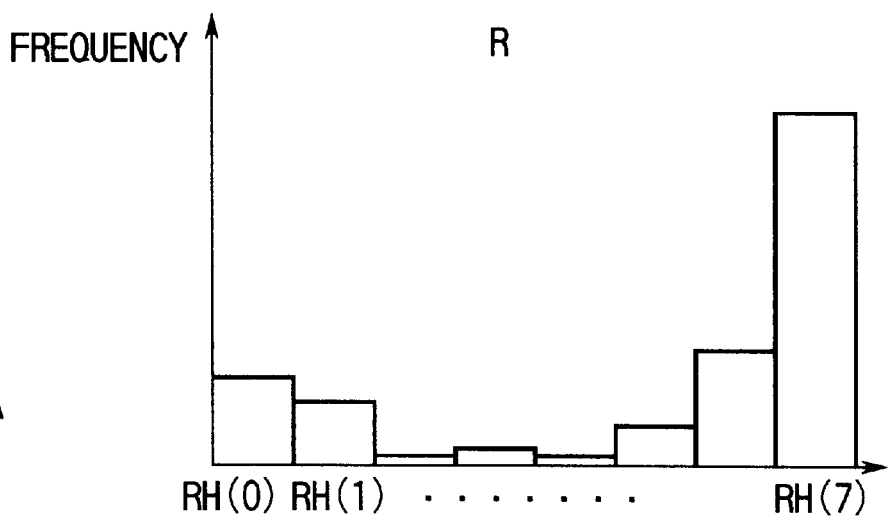
FIGS. 7A, 7B and 7C show exemplary histograms that can be used for the purpose of the invention.
Figure 7B:
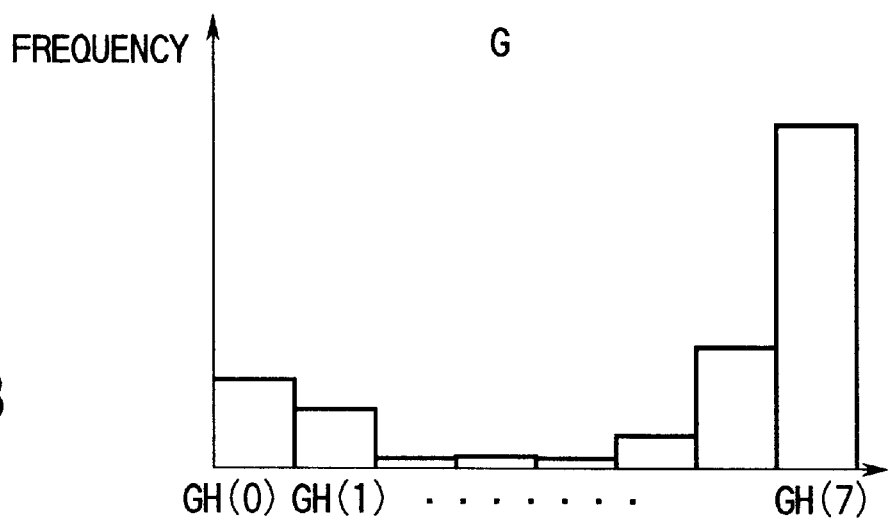
Figure 7C:
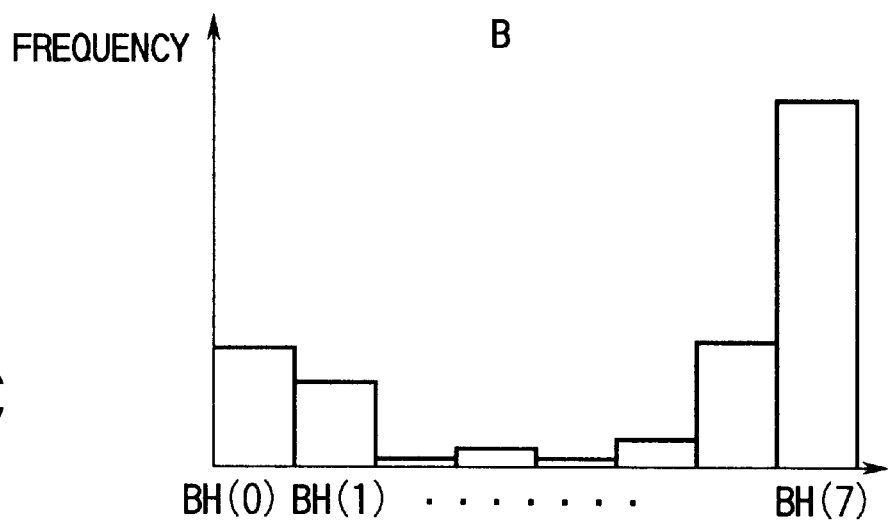
Figure 8A:
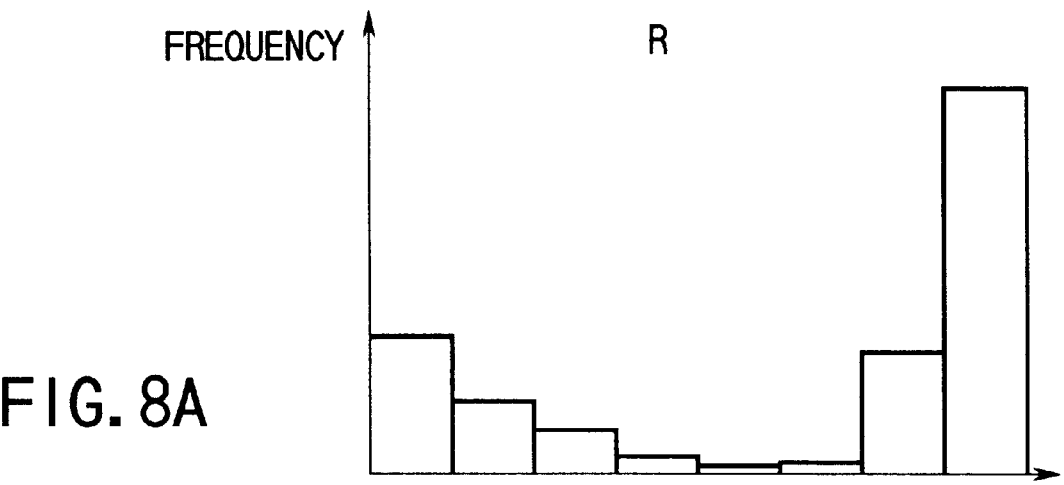
FIGS. 8A, 8B and 8C show other exemplary histograms that can also be used for the purpose of the invention.
Figure 8B:
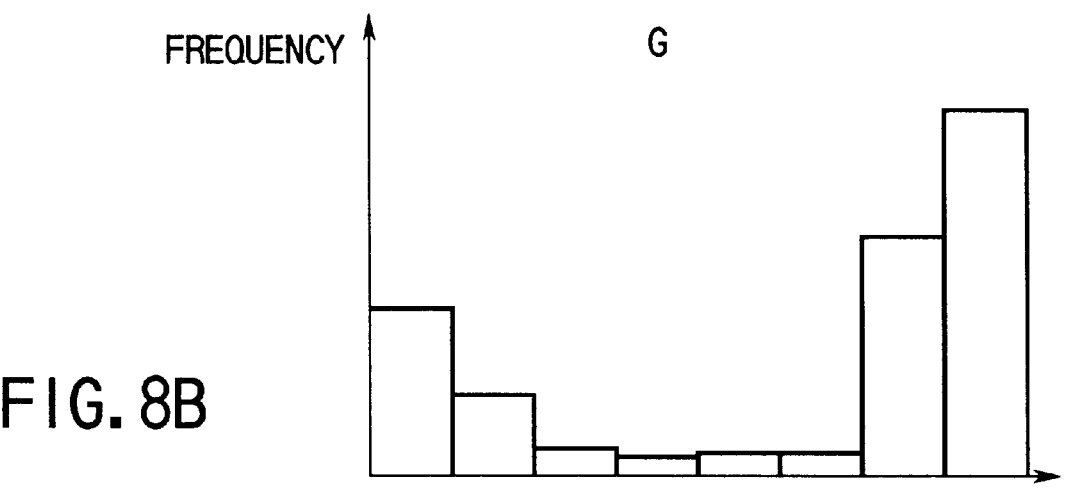
Figure 8C:
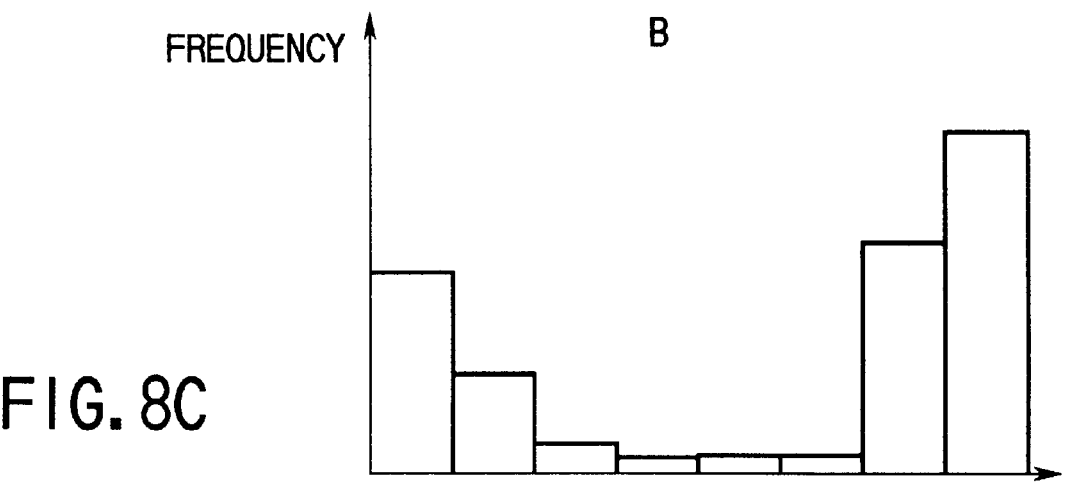

The histogram preparing section 152 prepares histogram information typically in the form as shown in FIGS. 7A, 7B and 7C. Note that FIGS. 7A, 7B and 7C are for an original in black and white (n=8) and RH, GH and BH show respective frequency distributions that are substantially equal to each other. High frequencies are show at the higher and lower density slots.

A proper operation of extracting color characteristics should be conducted on the values for R, G and B (not independently for R, G and B) and requires as many as n3 registers as shown below.

g=0: R<th1, G<th1 and B<th1,
g=1: R≦Th1, R<Th2, G<th1 and B<th1,
g=n: R<Th1, G≦Th1, G<Th2 and B<Th2,
g=n3−1: R≦Thn−1, G≦Thn−1 and B≦<Thn−1.

While the color characteristic abstracting section 141 of this embodiment determines histogram information independently for R, G and B, it can meet the requirements of any expected applications of the present invention and can remarkably reduce the memory capacity required for the embodiment.

The histogram information prepared by the color characteristic abstracting section 141 is then sent to the color/monochrome determining section 142, which determines the type of the original. The color/monochrome determining section 142 determines if the output should be in color or in black and white according to the histogram information prepared by and sent from the color characteristic abstracting section 141. It comprises a CPU and memories. It operates in a manner as will be discussed below.

FIGS. 8A, 8B and 8C and FIGS. 9A, 9B and 9C show histograms obtained by the color characteristic abstracting section 141 for an original in block and white and an original in color respectively. As clearly seen from FIGS. 8A, 8B and 8C, the histograms of image data R, G and B for an original in black and white show respective distribution patterns that are substantially identical relative to each other, whereas those of image data R, G and B for an original in color in FIGS. 9A, 9B and 9C show practically no significant correlation. Therefore, on the basis of the above characteristic features of the originals in color and in black and white, formula 1 below may be used to determine the type of the original to be copied.

original in black and white:

$$\sum_{i=0}^{n-1} |RH(i) - GH(i)| + |GH(i) - BH(i)| + |BH(i) - RH(i)| < TH$$

original in color:

$$\sum_{i=0}^{n-1} |RH(i) - GH(i)| + |GH(i) - BH(i)| + |BH(i) - RH(i)| \geq TH$$

With formula 1, the difference between any two of the image data R, G and B is determined for each density slot and then the obtained differences are added up for integration. The integrated value will be small for an original in black and white because the image data R, G and B show little difference for each density slot, whereas it will be relatively large for an original in color.

Note that the formula 1 above may be replaced by some other appropriate formula that can effectively discriminate between an original in color and an original in black and white.

Figure 10:
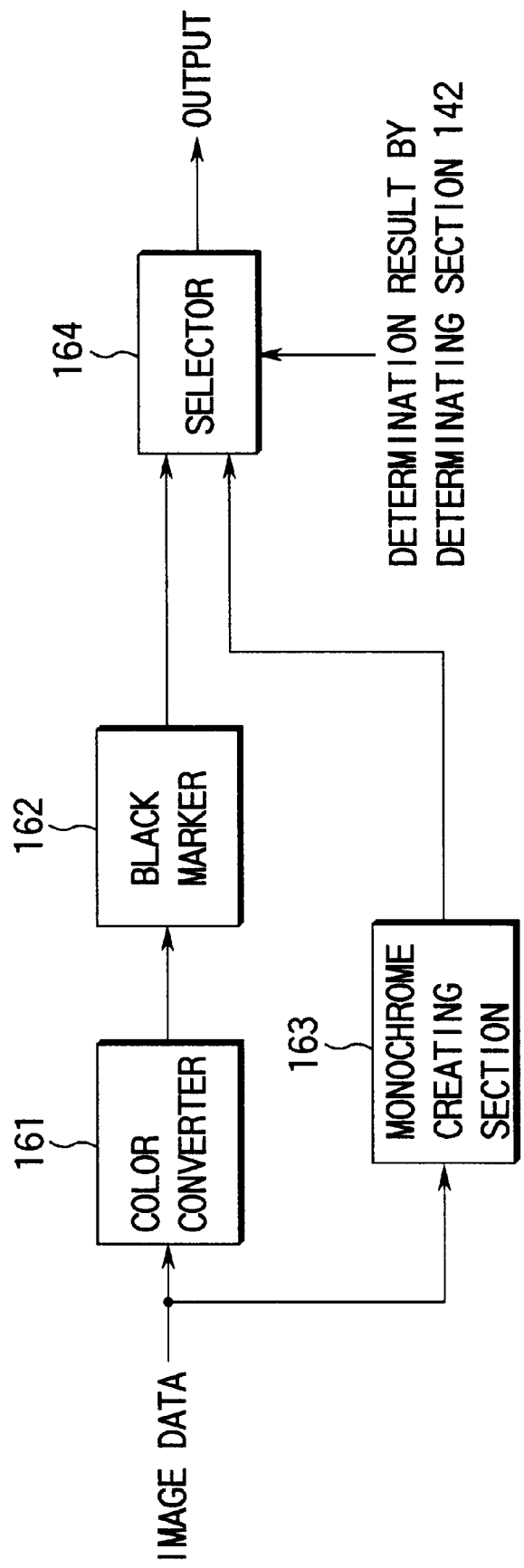
FIG. 10 is a schematic block diagram of: the color/monochrome output color determining section of the embodiment of FIG. 1.

The result of the determination by the color/monochrome determining section 142 is sent to the color/monochrome output color determining section 143 along with the image data R, G and B from the color scanner section 1. The color/monochrome output color determining section 143 produces a color signal or a monochromatic signal according to the outcome of the operation of the color/monochrome determining,section. It comprises a color converter 161, a black marker 162, a monochrome creating section 163 and a selector 164 as shown in FIG. 10.

The color converter 161 converts the image data R, G and B from the color scanner section 1 into color data c (cyan), m (magenta) and y (yellow) for controlling the respective supply rates of the coloring matters of the three primary colors. A number of different techniques may be conceivable for the transformation including the use of a masking equation as shown below.

$$\begin{bmatrix} c \\ m \\ y \end{bmatrix} = \begin{bmatrix} A_{11} & A_{12} & A_{13} \\ A_{21} & A_{22} & A_{23} \\ A_{31} & A_{32} & A_{33} \end{bmatrix} \begin{bmatrix} R \\ G \\ B \end{bmatrix} \qquad \text{[formula 2]}$$

where c, m and y represent the signal values for the coloring matters of the three primary colors obtained as a result of masking (and will be referred to as color signals c, m and y respectively), R, G and B represents the signal obtained by the color analysis performed by the color scanner section 1 and A ij represents a masking coefficient. Basically, the color converter 161 comprises a masking circuit designed on the basis of formula 2 above and FIG. 11 shows a circuit diagram that can be used for the color converter 161.

Figure 11:
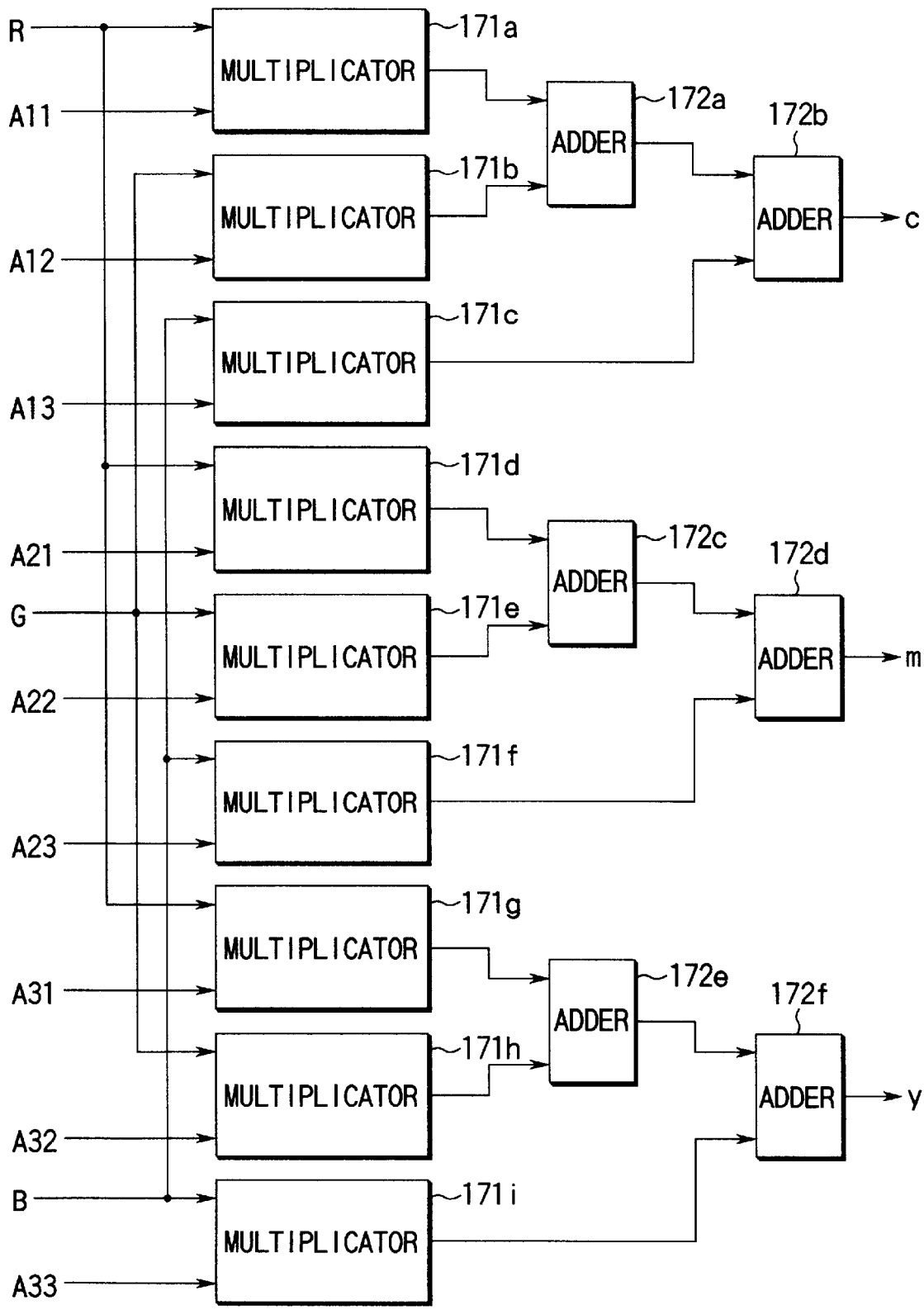
FIG. 11 is a schematic block diagram of the color converter of the embodiment of FIG. 1.

Referring to FIG. 11, the image data R, G and B from the color scanner section 1 are entered to respective multipliers 171*a*, 171*b* and 171*c*, where they are multiplied by coefficients A11, A12 and A13 respectively. The products of the multiplications of the multipliers 171*a* and 171*b* are entered to adder 172*a*, where they are added relative to each other. The product of the multiplication by the multiplier 171*c* and the sum of the addition by the adder 172*a* are then added relative to each other in adder 172*b* and the sum of the last addition is output as image data c.

Similarly, the image data R, G and B entered to respective multipliers 171*d*, 171*e* and 171*f* are multiplied by coefficients A21, A22 and A23 respectively. The products of the multiplications of the multipliers 171*d* and 171*e* are entered to adder 172*c*, where they are added relative to each other. The product of the multiplication by the multiplier 171*f* and the sum of the addition by the adder 172*c* are then added relative to each other in adder 172*d* and the sum of the last addition is output as image data m.

Finally, the image data R, G and B entered to respective multipliers 171*g*, 171*h* and 171*i* are multiplied by coefficients A31, A32 and A33 respectively. The products of the multiplications of the multipliers 171*g* and 171*h* are entered to adder 172*e*, where they are added relative to each other. The product of the multiplication by the multiplier 171*i* and the sum of the addition by the adder 172*e* are then added relative to each other in adder 172*f* and the sum of the last addition is output as image data y.

The black marker 162 is used to reduce the consumption of coloring matters and improve the color reproduction of the apparatus. Its operation is based on the fact that black is produced when coloring matters of cyan, magenta and yellow are added at a same rate and the lowest consumption rates of the three coloring matters are used to define the consumption rate of a black matter. Thus, if the image data that corresponds to the consumption rate of a black matter is K, it is expressed by the equation below.

$$K=\min(c, m, y)$$

where min represents a function for obtaining the lowest consumption rate of the black matter.

Therefore, the data representing the net consumption rates of the coloring matters of cyan, magenta and yellow can be obtained by removing the consumption rate of the black matter from the respective consumption rates, using the following equations.

$$C=c-K$$

$$M=m-K$$

$$Y=y-K$$

Thus, the consumption rates of the three coloring matters can be reduced by minimizing the rate of overlapped use of any of them and utilizing the consumption rate of the black matter defined by their consumption rates.

Figure 12:
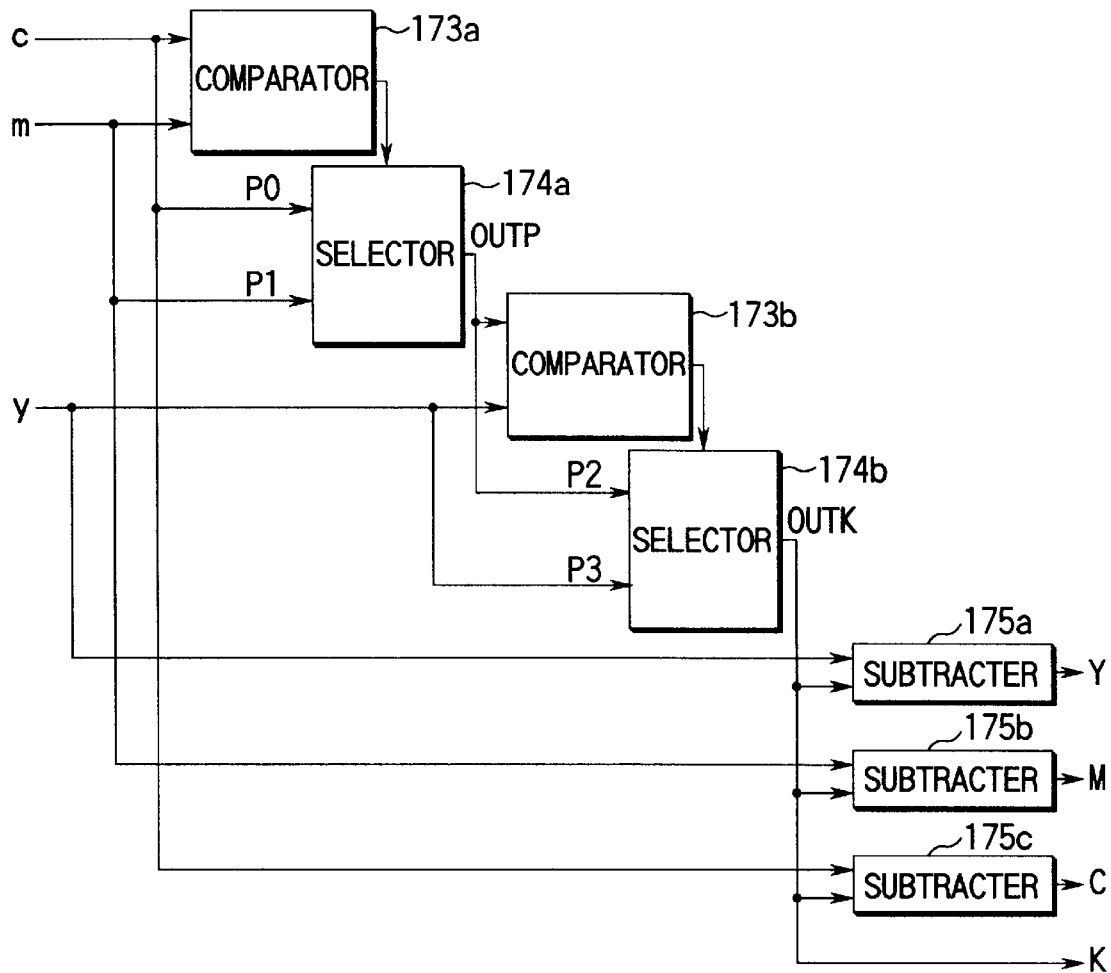
FIG. 12 is a schematic block diagram of the black marker of the embodiment of FIG. 1.

FIG. 12 shows a circuit diagram that can be used for the black marker 162 for generating values for the color signals of c, m and y by removing the defined value for the black matter K from them.

Referring to FIG. 12, comparator 173a compares color signal c and color signal m for their values and a signal representing the outcome of the comparison is sent to selector 174a as control signal.

The selector 174a receives color signal c and color signal m through its respective input ports P0 and P1 and selects one of the input ports (e.g., the input port P0 when c is smaller) according to the control signal from the comparator 173a and outputs the signal at the selected input port. Thus, its output signal OUTP is expressed by the formula below.

$$OUTP=\min(c, m)$$

Similarly, comparators 173b compares output signal OUTP and color signal y for their values and a signal representing the outcome of the comparison is sent to selector 174b as control signal. The selector 174b receives output signal OUTP and color signal y through its respective input ports P2 and P3 according to the control signal. Thus, its output signal OUTK is expressed by the formula below and used to represent the value of the black component.

$$OUTK=\min(c, m, y)$$

Then, color signal y and color signal K are entered to subtracter 175a, which produces color data Y by subtracting signal K from signal y. Similarly, color data M is produced from subtracter 175b by subtracting signal K from signal m and color data C is produced from subtracter 175c by subtracting signal K from signal c.

Figure 13:
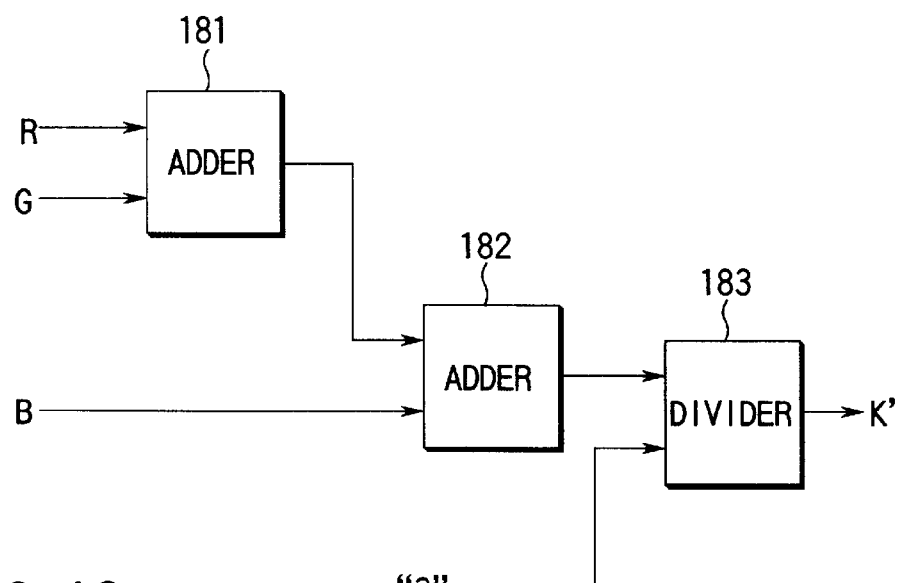
FIG. 13 is a schematic block diagram of the monochrome creating section of the embodiment of FIG. 1.

The monochrome creating section 163 generates monochrome signal K' from the image data R, G and B from the color scanner section 1 and typically has a configuration as shown in FIG. 13. Monochrome signal K' is generated by means of the formula below.

$$K'=(R+G+B)/3$$

In short, the average of the R, G and B image data is determined and used as monochrome signal K'.

Referring to FIG. 13, the image data R and G from the color scanner section 1 are received and added by adder 181. The sum of the addition by the adder 181 is and the image data B from the color scanner section 1 are fed to and added by adder 182. The sum of the addition by the adder 182 and a value of "3" is entered to divider 183, who divides the sum from the adder 182 by "3". The quotient of the division is used :as monochrome signal K'.

The selector 164 selects either the output of the black marker 162 and that of the monochrome creating section 163 and transmits it to the color printer section 2. Thus, the output C, M, Y and K of the black marker 162 will be selected if the result of the determination by the color/monochrome determining section 142 indicates color, whereas the output K' of the monochrome generating section 163 will be selected if the result indicates monochrome.

Now, the overall operation of the embodiment will be summarized below.

Firstly, the color picture of the original is read out by the color scanner section 1, which then output color image data R, G and B. The color image data R, G and B from the color scanner section 1 are then fed to the color characteristic abstracting section 141 and the color/monochrome output color determining section 143.

The color characteristic abstracting section 141 prepares histogram information for the chromatic distribution of the original representing the chromatic characteristics of the latter out of the image data R, G and B from the color scanner section 1 and transmits the prepared information to the color/monochrome determining section 142. The color/monochrome determining section 142 then determines if the output is to be in color or in black and white on the basis of the histogram information from the color characteristic abstracting section 141 and transmits the result of the determination to the color/monochrome output color determining section 143.

The color data output from by the color/monochrome output color determining section 143 are then sent to the color printer section 2, which produces an optimally copied image, using the color data obtained from the color picture of the original.

Now, a second embodiment of the invention will be described below.

This second embodiment is adapted to originals in black and white, those in white and a single color (where monochromatic characters and graphics are printed on a white sheet of paper) and those in full color.

Figure 14:
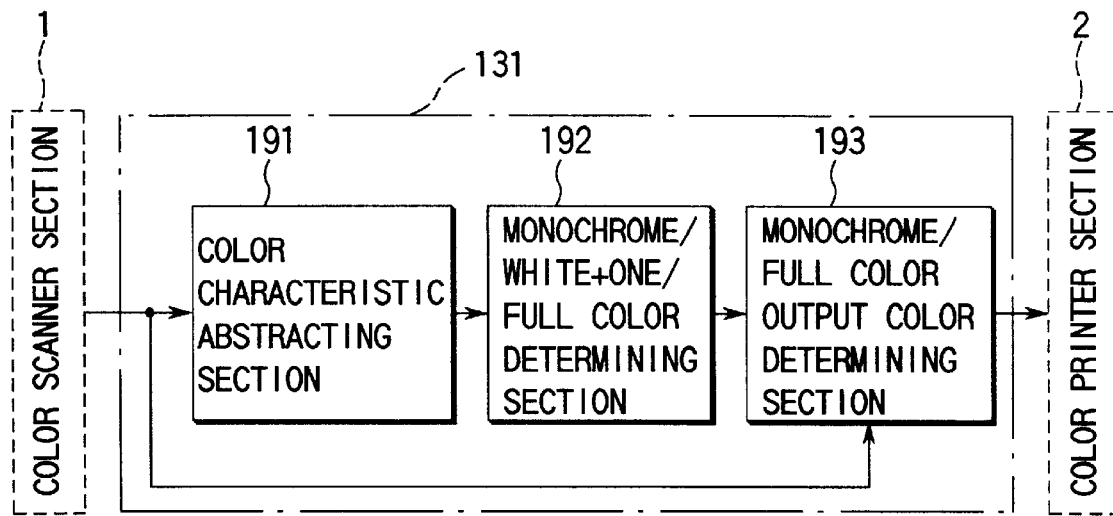
FIG. 14 is a schematic block diagram of the image processor of a second embodiment of image forming apparatus according to the invention.

FIG. 14 is a schematic block diagram of the image processing section 131 of the second embodiment that comprises a color characteristic abstracting section 191, monochrome/white+one color/full color determining section 192 and a monochrome/full color output color determining section 193. Since the color characteristic abstracting section 191 and the monochrome/full color output color determining section 193 of the second embodiment are identical with the color characteristic abstracting section 141 and the color/monochrome color output color determining section 143 of the first embodiment respectively, they will not be described here any further.

The monochrome/white+one color/full color determining section 192 determines if the output should be in color or in black and white according to the histogram information prepared by and sent from the color characteristic abstracting section 191. It comprises a CPU and memories. It operates in a manner as will be discussed below.

FIGS. 8A, 8B and 8C, FIGS. 9A, 9B and 9C and FIGS. 15A, 15B and 15C show histograms obtained by the color characteristic abstracting section 141 for an original in block and white, an original in color and an original carrying characters printed in red respectively. As clearly seen from FIGS. 8A, 8B and 8C, the histograms of image data R, G and B for an original in black and white show respective distribution patterns that are substantially identical relative to each other, whereas those of image data R, G and B for an original in color in FIGS. 9A, 9B and 9C show practically no significant correlation. As seen from FIGS. 15A, 15B and 15C, the histograms of image data for an original carrying characters printed in red shows respective distribution patterns that are substantially identical for lower density slots but different from each other for higher density slots. Therefore, on the basis of the above characteristic features of the originals in color, those in black and white and those in white and a single color, formula 3 below may be used to determine the type of the original to be copied.

original in black and white:

$$\sum_{i=0}^{n/2-1} |RH(i) - GH(i)| + |GH(i) - BH(i)| + |BH(i) - RH(i)| < TH1$$

and $$\sum_{i=n/2}^{n-1} |RH(i) - GH(i)| + |GH(i) - BH(i)| + |BH(i) - RH(i)| < TH2$$

original in color:

$$\sum_{i=n/2}^{n-1} |RH(i) - GH(i)| + |GH(i) - BH(i)| + |BH(i) - RH(i)| \geq TH2$$

original in white and a single color:

$$\sum_{i=0}^{n/2-1} |RH(i) - GH(i)| + |GH(i) - BH(i)| + |BH(i) - RH(i)| \geq TH1$$

and $$\sum_{i=n/2}^{n-1} |RH(i) - GH(i)| + |GH(i) - BH(i)| + |BH(i) - RH(i)| < TH2$$

With formula 3 above, the difference between any two of the image data R, G and B is determined for each density slot and then the obtained differences are added up for integration. The integrated value will be small for an original in black and white because the image data R, G and B show little difference for each density slot. The integrated value will be small for lower density slots, whereas it will be large for higher density slots for an original in white and a single color. Finally, the integrated value it will be relatively large for an original in color.

Thus, originals are discriminated for monochrome, white+one color and full color. Then, the monochrome/white+one color/full color determining section 192 determines that the original is in black and white if it is found to be either in black and white or in white+one color, whereas it determines that the original is in color if it is found to be in full color. Originals in white and a single color are preferably copied more often than not in black and white to save costly coloring matters.

Now, a third embodiment of the invention will be described below.

Like the second embodiment, this third embodiment is adapted to originals in black and white, those in white and a single color (where monochromatic characters and graphics are printed on a white sheet of paper) and those in full color.

Figure 16:
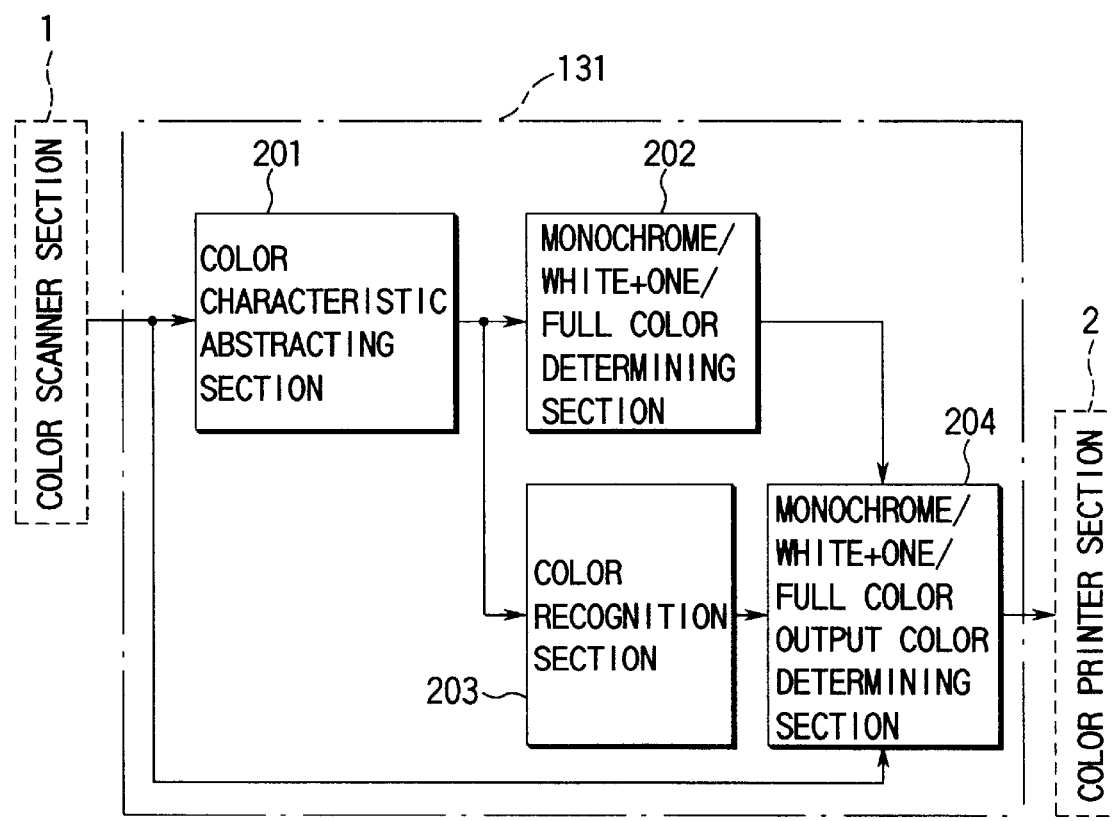
FIG. 16 is a schematic block diagram of the image processor of a third embodiment of image forming apparatus according to the invention.
Figure 15A:
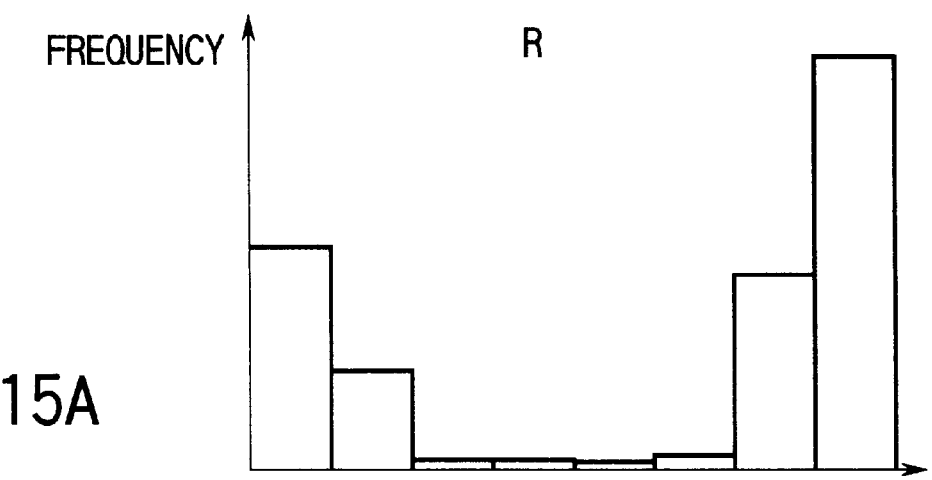
FIGS. 15A, 15B and 15C show exemplary histograms that can be used for the purpose of the invention.
Figure 15B:
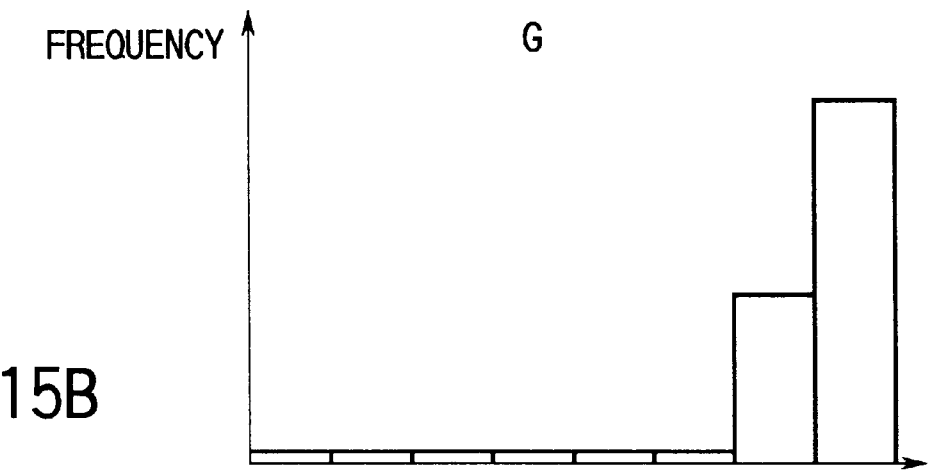
Figure 15C:
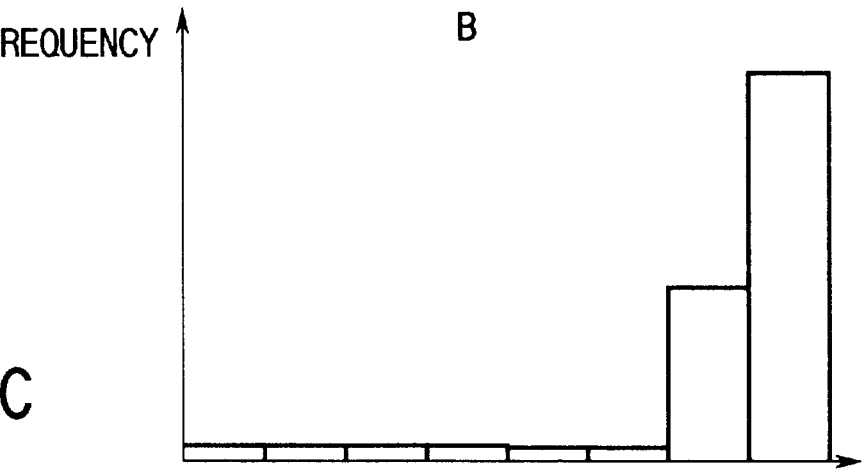

FIG. 16 is a schematic block diagram of the image processing section 131 of the second embodiment that comprises a color characteristic abstracting section 201, monochrome/white+one color/full color determining section 202, a color recognition section 203 and a monochrome/white+one color/full color output color determining section 204. Since the color characteristic abstracting section 201 of the third embodiment is identical with the color characteristic abstracting section 141 of the first embodiment, it will not be described here any further.

The monochrome/white+one color/full color determining section 202 is identical with the monochrome/white+one color/full color determining section 192 of the second embodiment in terms of configuration but operates differently for defining its output. Thus, the monochrome/white+one color/full color determining section 202 discriminates originals for monochrome, white+one color and full color and determines its outputs for them also as monochrome, white+one color and full color.

The color recognition section 203 recognizes the color of the colored area of the original in white and a single color and comprises a CPU. It operates for determining the color of the original in a manner as expressed by formula below.

0 (red): RH(0)>th and GH(0)<th and BH(0)<th 1 (green): RH(0)<th and GH(0)>th and BH(0)<th 2 (blue): RH(0)<th and GH(0)<th and BH(0)>th 3 (yellow): RH(0)>th and GH(0)>th and BH(0)<th 4 (magenta): RH(0)>th and GH(0)<th and BH(0)>th 5 (cyan): RH(0)<th and GH(0)>th and BH(0)>th For example, the above formula may be used in conjunction with the histograms of FIGS. 15A, 15B and 15C for an original carrying characters printed in red. By comparing the histograms and the above formula (for RH(0), GH(0) and BH(0)), it will be seen that only RH(0) shows a value above the threshold so that the color should be determined to be red ("0").

The monochrome/white+one color/full color output color determining section 204 conducts an operation of color signal transformation for color or black and white according to the result of determination of the monochrome/white+one color/full color determining section 202 and outputs the transformed signal.

Figure 17:
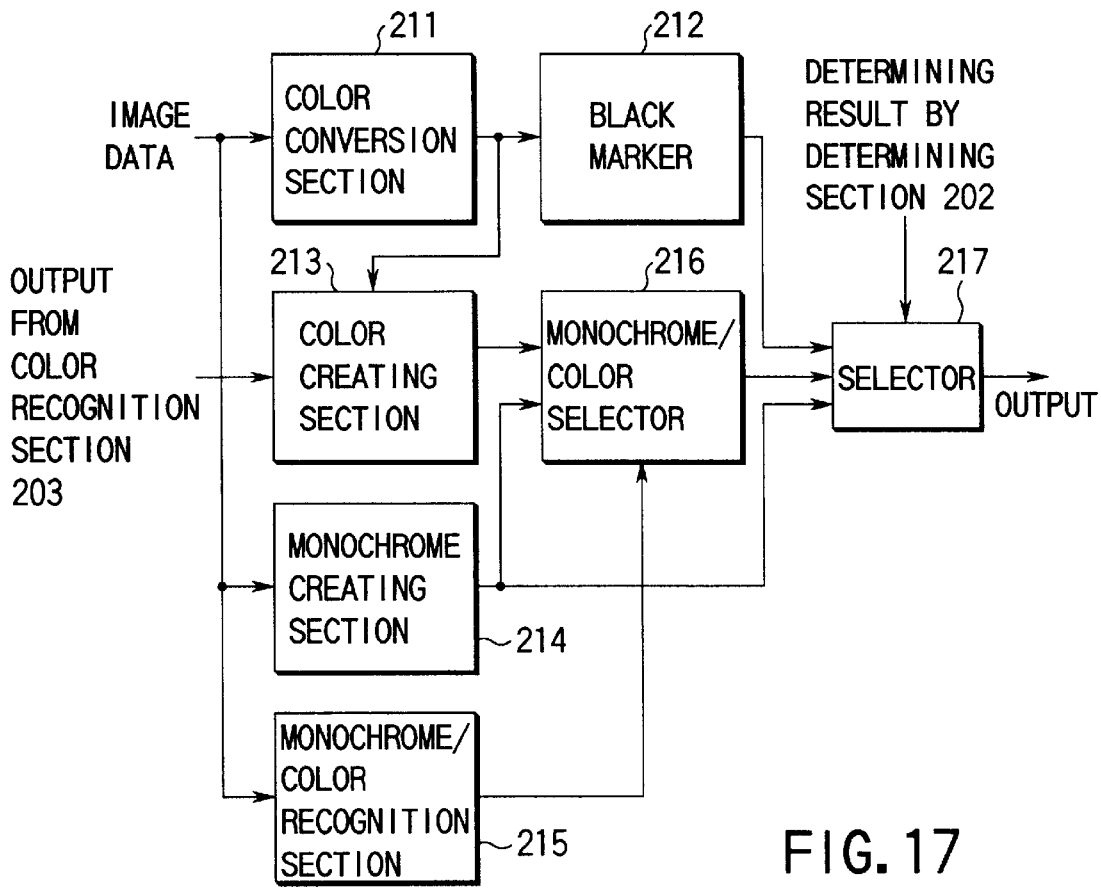
FIG. 17 is a schematic block diagram of the monochrome/white+one color/full color determining section of the embodiment of FIG. 16.

As shown in FIG. 17, the monochrome/white+one color/full color output color determining section 204 comprises a color conversion section 211, a black marker 212, a color creating section 213, a monochrome creating section 214, a monochrome/color recognition section 215, a monochrome/color selector 216 and a selector 217.

Since the color conversion section 211, the black marker 212 and the monochrome creating section 214 are respectively identical with the color conversion section 161, the black marker 162 and the monochrome creating section 163 of the first embodiment, they will not be described here any further.

The color creating section 213 receives the color signals c, m and y produced by the color conversion section 211 and the signal representing result of the determination of the color recognition section 203. Then, the color creating section 213 outputs the signals c, m and y from the color conversion section 212 according to the determination of the color recognition section 203.

Figure 18:
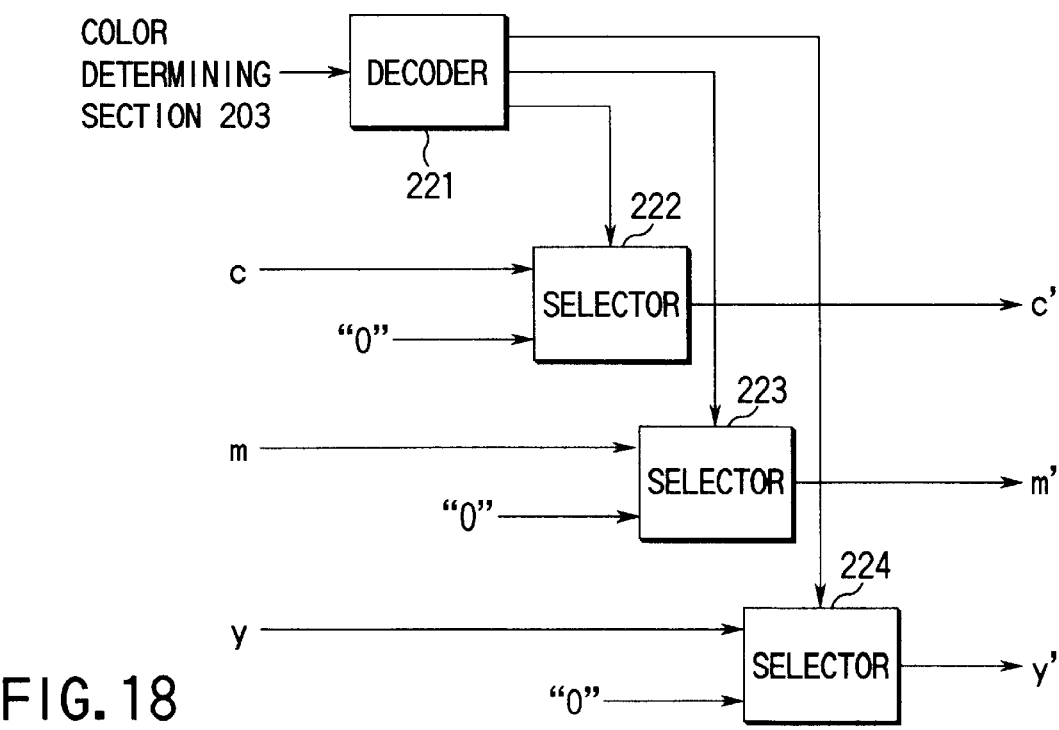
FIG. 18 is a schematic block diagram of the color creating section of the embodiment of FIG. 16.

As shown in FIG. 18, the color creating section 213 typically comprises a decoder 221 and selectors 222, 223 and 224. The decoder 213 generates selection signals for the selectors 222, 223 and 224 according to the result of determination of the color recognition section 203. For instance, if the result of determination of the color recognition section 203 indicates red ("0"), it generates selection a signal for causing the selector 222 to select "0", the selector 223 to select "m" and the selector 224 to select "y". In this way, the color creating section 213 outputs color signals c', m' and y' for the characters of the original printed in color.

Figure 19:
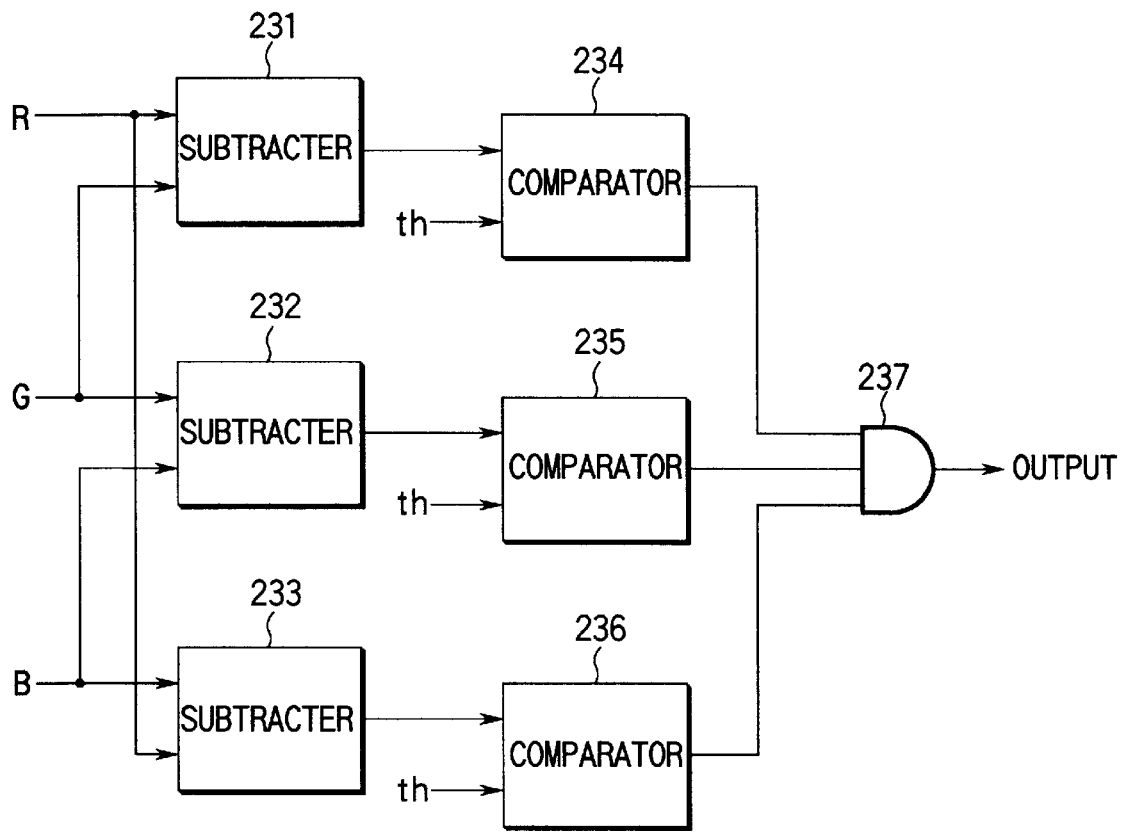
FIG. 19 is a schematic block diagram of the monochrome/color recognizing section of the embodiment of FIG. 16.

The monochrome/color recognition section 215 recognizes colored area(s) and white area(s) in the original in white+one color. As shown in FIG. 19, it typically comprises subtracters 231, 232 and 233 for receiving image data R, G and B from the color scanner section 1, comparators 234, 235 and 236 and a logical OR circuit 237.

The monochrome/color recognition section 215 determines the original to be in black and white or in color by means of the following formula.

black and white: |R−G|<th and |G−B|<th and |B−R|<th
color: |R−G|<th or |G−B|<th or |B−R|<th Referring to FIG. 19, the subtractors 231, 232 and 233 obtains the absolute values of R−GG, G−B and B−R respectively. The comparators 234, 235 and 236 compares |R−G|, |G−B| and |B−R| with threshold value th respectively. Each of them outputs "1" if the threshold value th is greater and "0" if the threshold value ah is smaller. The local OR circuit 23 receives the outcomes of the comparisons of the comparators 234, 235 and 236 and determines that the original is in black and white when they indicate "1" and that the original is in color when they indicate "0".

The monochrome/color selector 216 receives the outputs of the color creating section 213 and the monochrome creating section 214 and selects either of them according to the result of recognition of the monochrome/color recognition section 215. More specifically, it selects the color signal from the color creating section 213 if the result of recognition of the monochrome/color recognition section 215 indicates color, whereas it selects the signal from the monochrome creating section 214 if the result of recognition of the monochrome color recognition section 215 indicates black and white.

The operation of the monochrome/white+one color/full color output color determining section 204 is described above.

With the above arrangement, an original in black and white is copied in black and white and an original in full color is copied in full color. Additionally, an original carrying characters and graphics oh a white sheet of paper and printed in a single color is copied to produce a clear and high quality image by using a coloring matter at a minimal rate of consumption at reduced copying cost.

Now, a fourth embodiment of the invention will be described.

This fourth embodiment is adapted to originals in black and white, those in black and a single color (where black characters and graphics are printed on a monochromatic sheet of paper) and those in full color.

Figure 20:
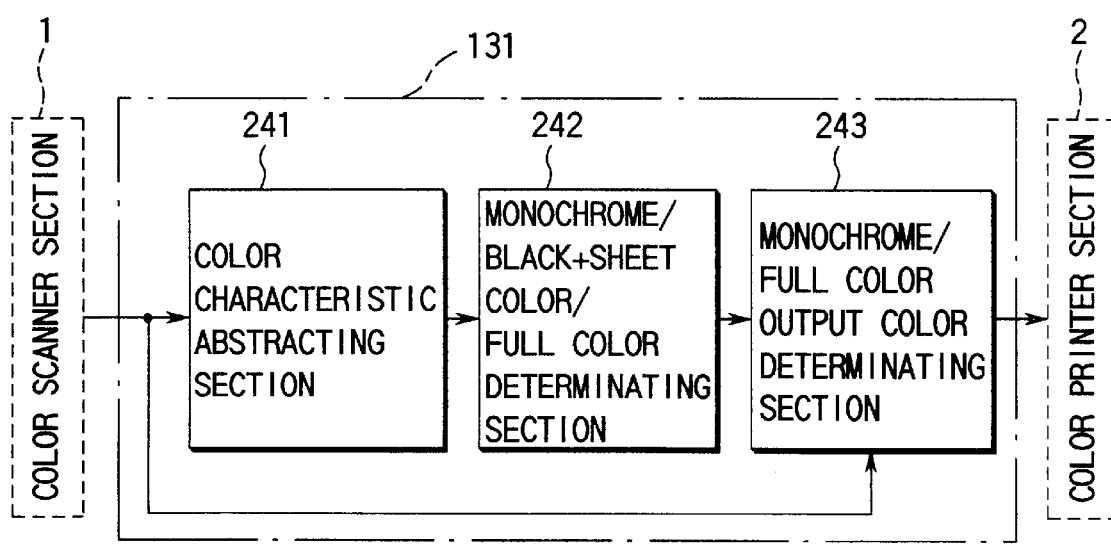
FIG. 20 is a schematic block diagram of the image processor of a fourth embodiment of image forming apparatus according to the invention.

FIG. 20 is a schematic block diagram of the image processing section 131 of the second embodiment that comprises a color characteristic abstracting section 241, monochrome/black+sheet color/full color determining section 242 and a monochrome/full color output color determining section 243. Since the color characteristic abstracting section 241 and the monochrome/full color output color determining section 243 of the fourth embodiment are identical with the color characteristic abstracting section 141 and the color/monochrome color output color determining section 143 of the first embodiment respectively, they will not be described here any further.

The monochrome/black+sheet color/full color determining section 242 is identical with the monochrome/white+one color/full color determining section 192 of the second embodiment in terms of configuration but operates differently for defining its output. Thus, the monochrome/black+sheet color/full color determining section 242 determines if the output should be in color or in black and white according to the color information such as histograms prepared by the color characteristic abstracting section 241 and comprises a CPU and memories. It operates for determining the color of the original in a manner as described below.

FIGS. 8A, 8B and 8C, FIGS. 9A, 9B and 9C and FIGS. 21A, 21B and 21C show histograms obtained by the color characteristic abstracting section 241 for an original in block and white, an original in color and an original carrying characters printed in black on a pale green sheet of paper respectively. As clearly seen from FIGS. 8A, 8B and 8C, the histograms of image data R, G and B for an original in black and white show respective distribution patterns that are substantially identical relative to each other, whereas those of image data R, G and B for an original in color in FIGS. 9A, 9B and 9C show practically no significant correlation. As seen from FIGS. 21A, 21B and 21C, the histograms of image data for an original carrying characters printed in black on a pale green sheet of paper shows respective distribution patterns that is substantially identical for higher density slots but different from each other for lower density slots. Therefore, on the basis of the above characteristic features of the originals in color, those in black and white and those in black and a sheet color, formula 4 below may be used to determine the type of the original to be copied.

[formula 4]

original in black and white:

$$\sum_{i=0}^{n/2-1} |RH(i) - GH(i)| + |GH(i) - BH(i)| + |BH(i) - RH(i)| < TH1$$

and $$\sum_{i=n/2}^{n-1} |RH(i) - GH(i)| + |GH(i) - BH(i)| + |BH(i) - RH(i)| < TH2$$

original in color:

$$\sum_{i=0}^{n/2-1} |RH(i) - GH(i)| + |GH(i) - BH(i)| + |BH(i) - RH(i)| \geq TH1$$

original in white and a single color:

$$\sum_{i=0}^{n/2-1} |RH(i) - GH(i)| + |GH(i) - BH(i)| + |BH(i) - RH(i)| < TH1$$

and $$\sum_{i=n/2}^{n-1} |RH(i) - GH(i)| + |GH(i) - BH(i)| + |BH(i) - RH(i)| \geq TH2$$

With formula 3 above, the difference between any two of the image data R, G and B is determined for each density slot and then the obtained differences are added up for integration. The integrated value will be small for an original in black and white because the image data R, G and B show little difference for each density slot. The integrated value will be small for higher density slots, whereas it will be large for lower density slots for an original carrying characters printed in black on a single color sheet of paper. Finally, the integrated value it will be relatively large for an original in color.

Thus, originals are discriminated for monochrome, black+sheet color and full color. Then, the monochrome/black+sheet color/full color determining section 242 determines that the original is in black and white if it is found to be either in black and white or in black+sheet color, whereas it determines that the original is in color if it is found to be in full color. Originals in black and sheet color are preferably copied more often than not in black and white to save costly coloring matters.

Now, a fifth embodiment of the invention will be described. Like the fourth embodiment, this fifth embodiment is adapted to originals in black and white, those in black and a single color (where black characters and graphics are printed on a monochromatic sheet of paper) and those in full color.

Figure 22:
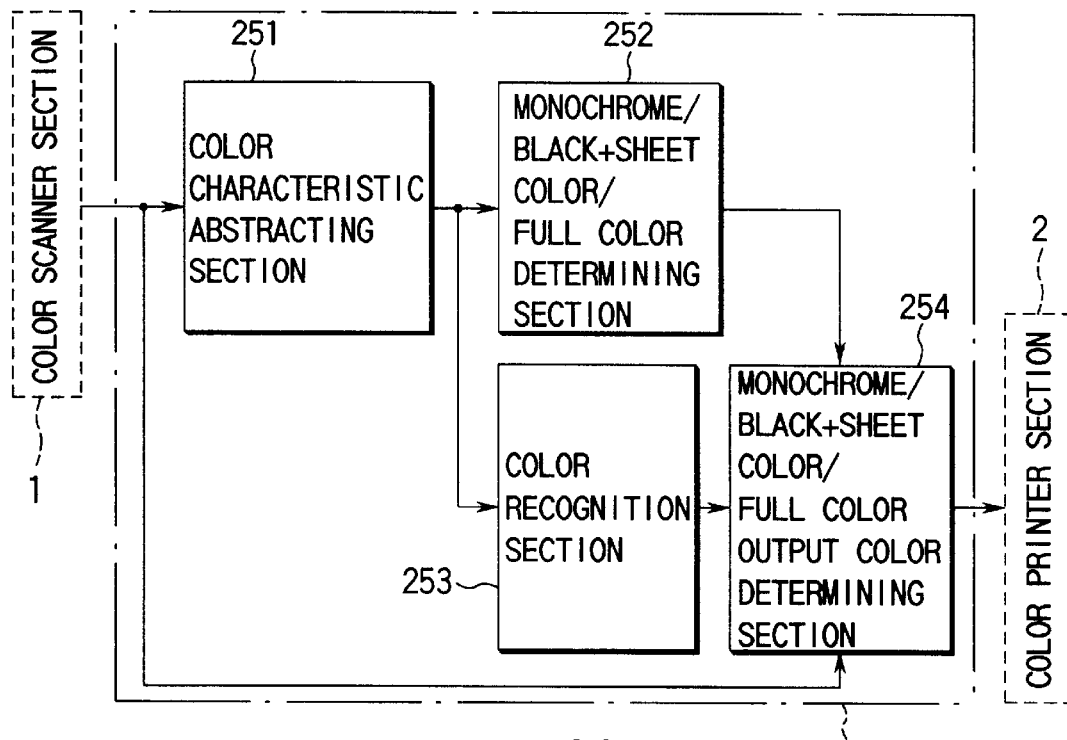
FIG. 22 is a schematic block diagram of the image processor of a fifth embodiment of image forming apparatus according to the invention.

FIG. 22 is a schematic block diagram of the image processing section 131 of the second embodiment that comprises a color characteristic abstracting section 251, monochrome/black+sheet color/full color determining section 252, color recognition section 253 and a monochrome/full color output color determining section 254. Since the color characteristic abstracting section 251 and the monochrome/full color output color determining section 252 of the fifth embodiment are identical with the color characteristic abstracting section 241 and the color/monochrome color determining section 242 of the forth embodiment respectively, they will not be described here any further.

The monochrome/black+sheet color/full color determining section 252 is identical with the monochrome/black+sheet color/full color determining section 242 of the fourth embodiment in terms of configuration but operates differently for defining its output. Thus, the monochrome/black+sheet color/full color determining section 252 determines if input original is in black and white, in black and sheet color or in full color on the basis of the color information prepared by the color characteristic abstracting section 241, using formula 4 above.

Figure 21A:
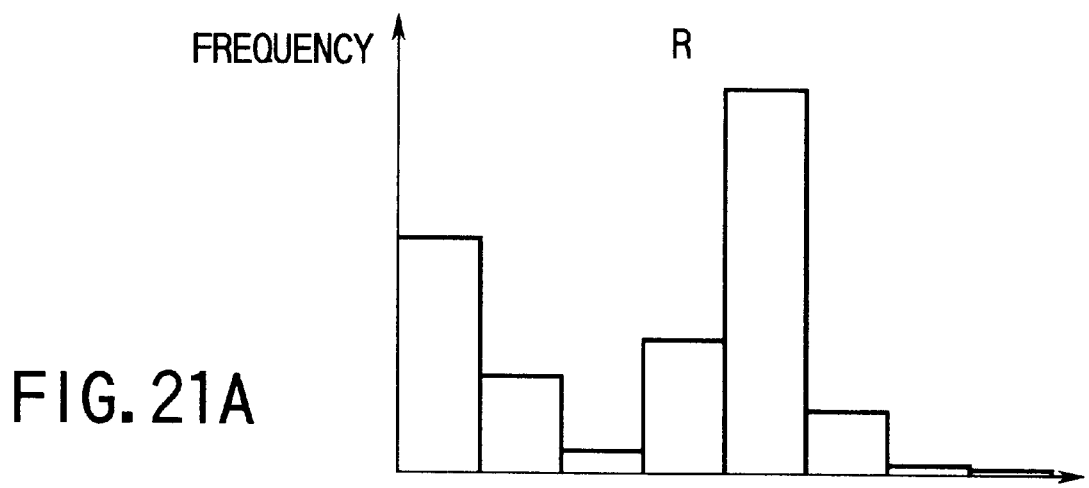
FIGS. 21A, 21B and 21C show exemplary histograms that can be used for the purpose of the invention.
Figure 21B:
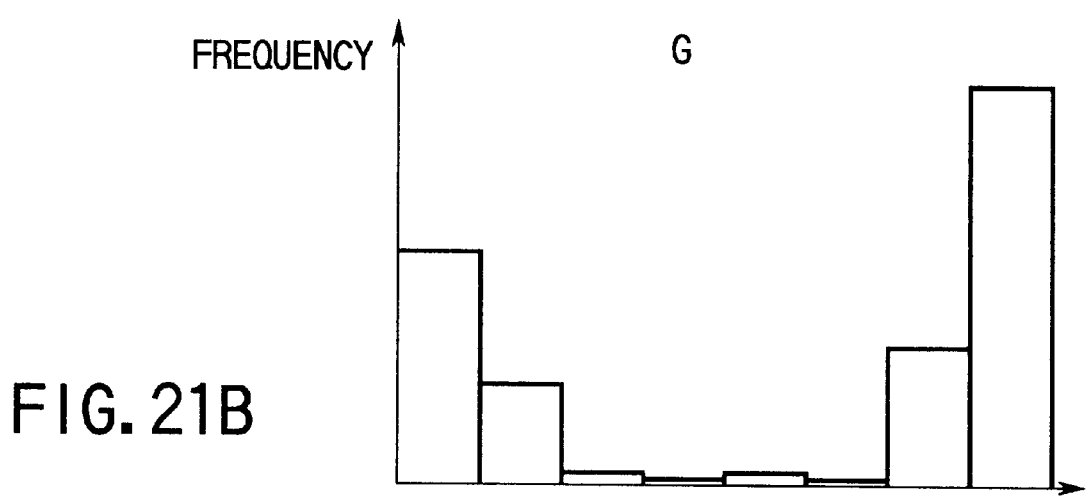
Figure 21C:
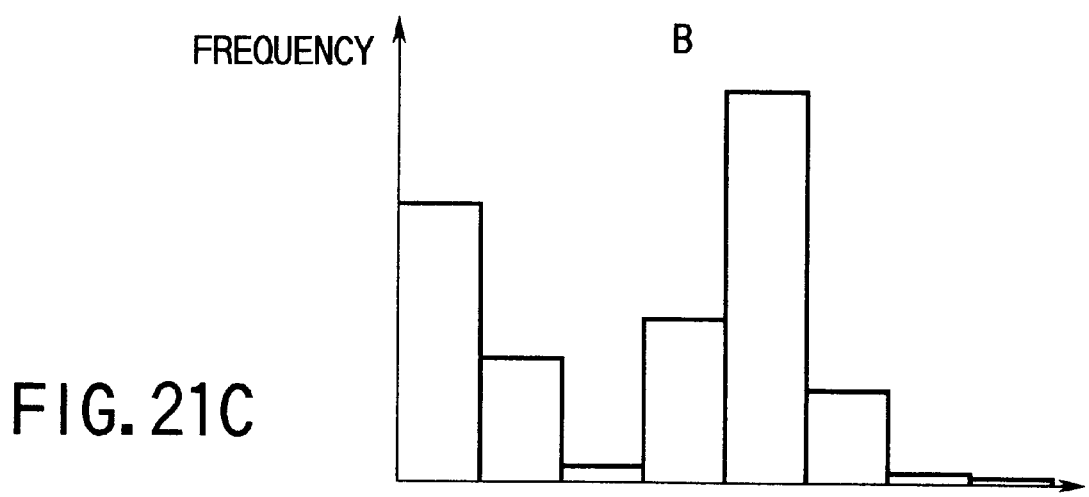

The color recognition section 253 recognizes the colored area of the original if it carries characters printed in black on a single color sheet of paper and comprises a CPU. It operates for determining the color of the original in a manner as described below by way of an example. Referring now to FIGS. 21A, 21B and 21C showing histograms for an original carrying characters printed in black on a pale green sheet of paper, it locates the peaks for R, G and B in lower density slots and determines the values for R, G and B at the respective peaks.

More specifically, firstly it finds out the locations of the peaks Pr, Pg and Pb for R, G and B respectively from the histograms and determines Rd=Pr,
Gd=Pg and
Bd=Pb as color information for the embodiment. Thus, in this example, (Rd, Gd, Bd) provide color signals for the paper sheet of the original. The color recognition section 253 outputs the sheet color signals of Rd, Gd and Bd.

The monochrome/black+sheet color/full color output color determining section 254 conducts an operation of color signal transformation for color or black and white according to the result of determination of the monochrome/black+sheet color/full color determining section 252 and outputs the transformed signal.

Figure 23:
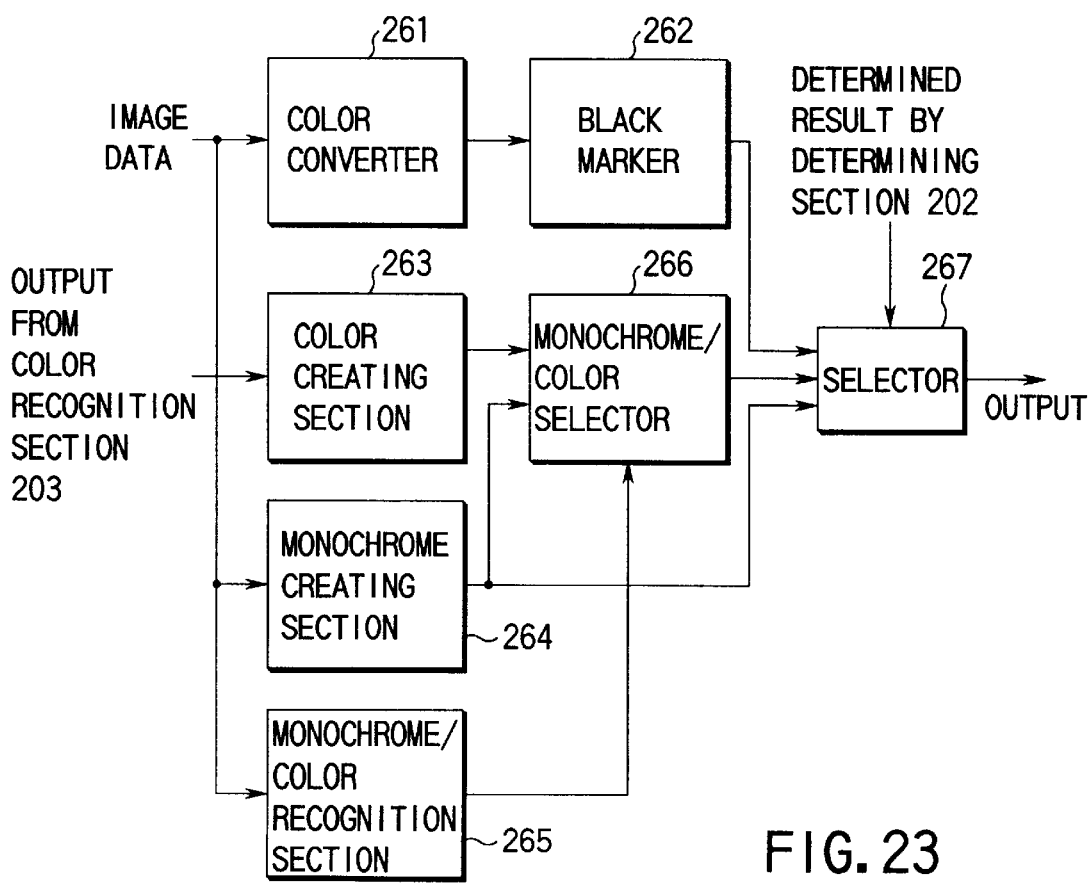
FIG. 23 is a schematic block diagram of the monochrome/black+sheet color/full color determining section of the embodiment of FIG. 16.

As shown in FIG. 23, the monochrome/black+sheet color/full color output color determining section 254 comprises a color conversion section 261, a black marker 262, a color creating section 263, a monochrome creating section 264, a monochrome/color recognition section 265, a monochrome/color selector 266 and a selector 267.

Since the color conversion section 261, the black marker 262 and the monochrome creating section 264 are respectively identical with the color conversion section 161, the black marker 162 and the monochrome creating section 163 of the first embodiment, they will not be described here any further.

The color creating section 263 receives the color signals Rd, Gd and Bd produced by and representing the result of determination of the color recognition section 253. Then, the color creating section 263 transforms them into volume data cd, md and yd for coloring matters of cyan, magenta and yellow for the color printer section 2 respectively. While the transformation utilizes formula 5 below that is equivalent to formula 2 above, the transformation does not take place on a pixel by pixel basis but only for each original sheet and for a single color.

$$\begin{bmatrix} cd \\ md \\ yd \end{bmatrix} = \begin{bmatrix} A_{11} & A_{12} & A_{13} \\ A_{21} & A_{22} & A_{23} \\ A_{31} & A_{32} & A_{33} \end{bmatrix} \begin{bmatrix} Rd \\ Gd \\ Bd \end{bmatrix} \quad \text{[formula 5]}$$

Note that the monochrome/color recognition section 265, the monochrome/color selector 266 and the selector 267 are identical with and operate same as the monochrome/color recognition section 215, the monochrome/color selector 216 and the selector 217 of the third embodiment respectively.

With the above embodiment, an original in black and white is copied in black and white and an original in full color is copied in full color. Additionally, an original carrying characters and graphics printed in black on a sheet of paper such as a handbill or a leaflet can be copied to produce a clear and high quality image by using a coloring matter.

Now, a sixth embodiment of the invention will be described.

The sixth embodiment is adapted to produce an accurate and clear copy by determining character areas and non-character areas on the original.

Figure 24:
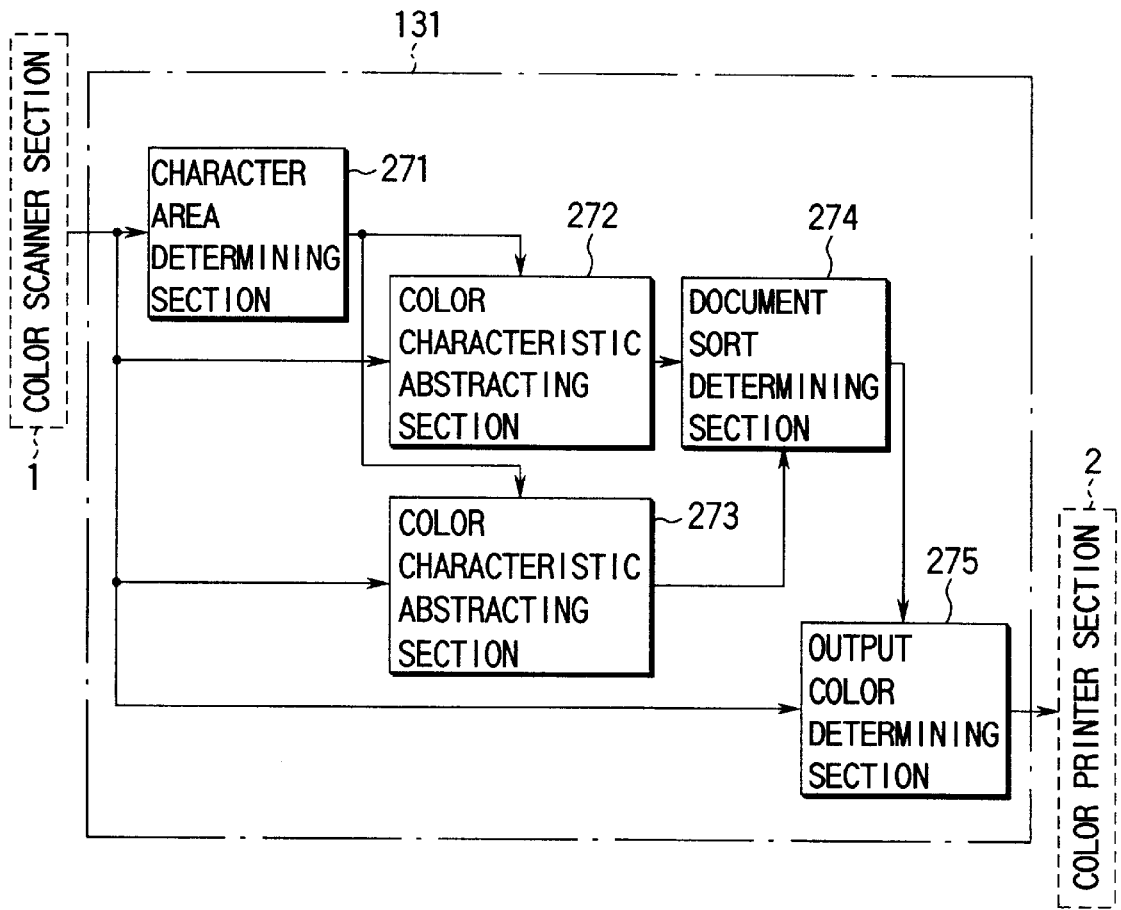
FIG. 24 is a schematic block diagram of the image processor of a sixth embodiment of image forming apparatus according to the invention.

FIG. 24 shows a schematic block diagram of the image processing section 131 of the sixth embodiment. It comprises a character area determining section 271, color characteristic abstracting sections 272, 273, a document sort determining section 274 and a color/monochrome output color determining section 275. Each of the color characteristic abstracting sections 272, 273, the document sort determining section 274 and the color/monochrome output color determining section 275 are identical with the color characteristic abstracting section 141, the color/monochrome determining section 142 and the color/monochrome output color determining section 143 of the first embodiment and hence will not be described here any further.

The character area determining section 271 determines if an attention-attracting area of the image that is being processed is a character area or a photograph area. More specifically, the character area determining section 271 draws a characteristic feature of the image that is being processed from the image data of a local area containing an attention-attracting area. For example, such a characteristic feature (the largest density difference) may indicate that the image data of the local area are specific to a character image or a non-character image. The operation of the character area determining section 271 will be described in greater detail below.

Figure 25:
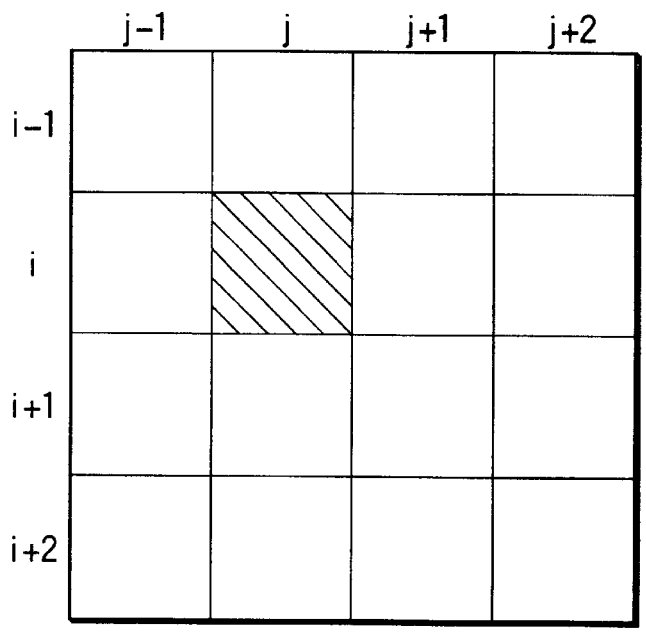
FIG. 25 is a schematic exemplary illustration of the operation of the character area determining section of the embodiment of FIG. 24.
Figure 26:
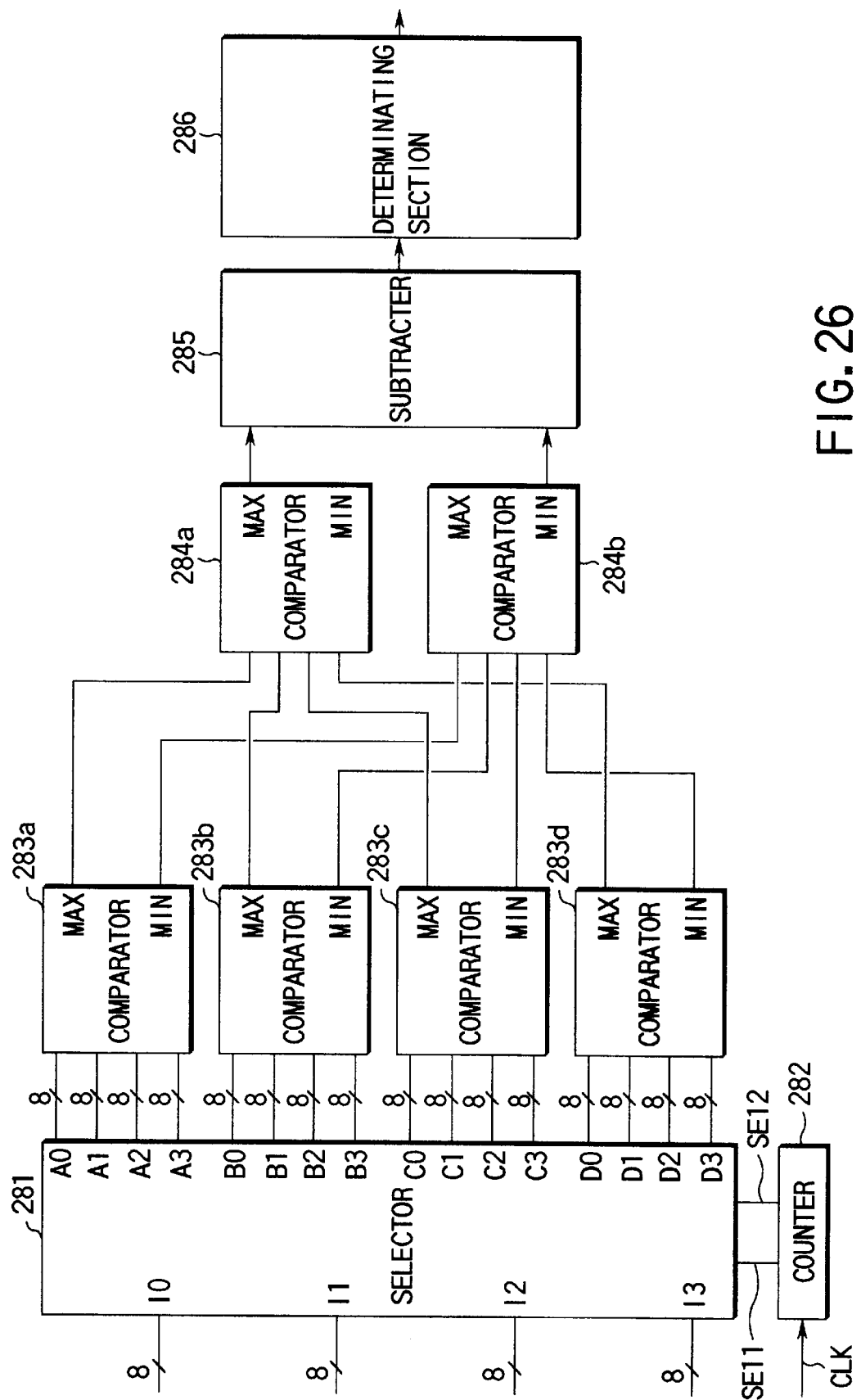
FIG. 26 is a schematic block diagram of the character area determining section of the embodiment of FIG. 24.

Referring to FIG. 25, the character area determining section 271 determines the largest value and the smallest value of density in a (4×4) pixel area that contains an attention-attracting pixel (shaded pixel) and subtracts the latter from the former to obtain the largest density difference (a characteristic feature). As shown in FIG. 26, it typically comprises a selector 281, a counter 282, four comparators 283a through 283d, a pair of comparators 284a and 284b, a subtracter 285 and a determining section 286.

Figure 27:
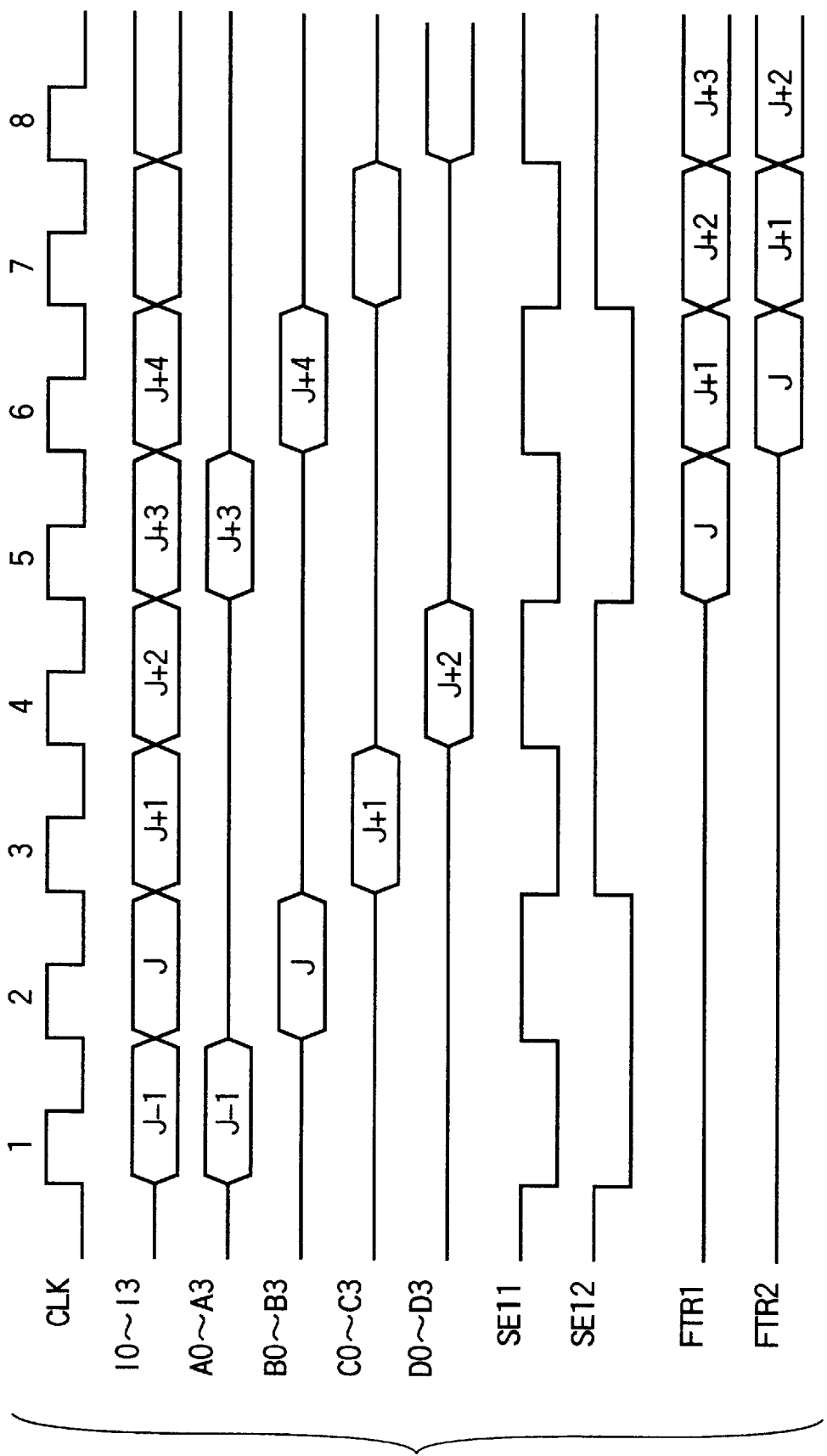
FIG. 27 is a timing chart for the operation of the character area determining section of the embodiment of FIG. 24.

The character area determining section 271 operates in a manner as described below by referring to the timing chart of FIG. 27. Image data (8 bits/pixel) are sequentially fed to it for the four pixels in every row from a line buffer (not shown) in synchronism with clock pulse CLK and distributed among the comparators 283a through 283d by way of the selector 281.

The above distribution of image data fed for the four pixels in every row among the comparators 283a through 283d by the selector 281 is controlled by selection signals SE11 and SE12 from the 2-bit counter 282 that operates according to clock pulse CLK.

The comparators 283a through 283d compares the image data they receives for the four pixels in a row and determines the highest density and the lowest density of the row. Then, the comparators 284a and 284b receives the highest densities and the lowest densities determined by the comparators 283a through 283d with timings provided by timing signal FTR1 and determines the largest value of the highest densities and that of the lowest densities obtained for all the rows.

As a result of the above sequence of comparisons, the largest value Dmax and the smallest value Dmin of density within the (4×4) pixel area in FIG. 25 and outputs from the comparators with a timing provided by timing signal FTR2.

Then, the subtracter 285 determines the largest density difference that is the difference between the largest value Dmax and the smallest value Dmin of density.

$$\Delta Dmax = Dmax - Dmin$$

The determining section 286 determines if the area is a character area or a non-character area by means of the largest density difference ΔDmax and the formulas below, character area: $\Delta Dmax > Th1$ and non-character area: $\Delta Dmax < Th1$ where Th1 is a predetermined threshold value.

Then, the color characteristic abstracting sections 272, 273 extracts color characteristics from both the character area and the non-character area determined by the character area determining section 281. Since each of the color characteristic abstracting sections 272 and 273 has a configuration identical with that of the color characteristic abstracting section 141 of the first embodiment, they will not be described here any further for configuration.

Then, the document sort determining section 274 determines if the output should be in color or in black and white from the color information extracted by the color characteristic abstracting sections 272 and 273. The document sort determining section 274 typically comprises a CPU and memories and performs its determining operation by applying the formula 1 above to character areas and non-character areas.

character area=color, non-character area=color: full color character area=color, non-character area monochrome: multi-color character area=monochrome, non-character area=color: full color character area=monochrome, non-character area= monochrome: monochrome Thus, an original carrying having one or more than one character areas printed in color can be copied also in color for that area(s) by using a coloring matter at a minimal rate of consumption at reduced copying cost.

Now, a seventh embodiment of the invention will be described below.

This seventh embodiment is adapted to produce an accurate and clear copy by determining background areas and non-background areas on the original.

Figure 28:
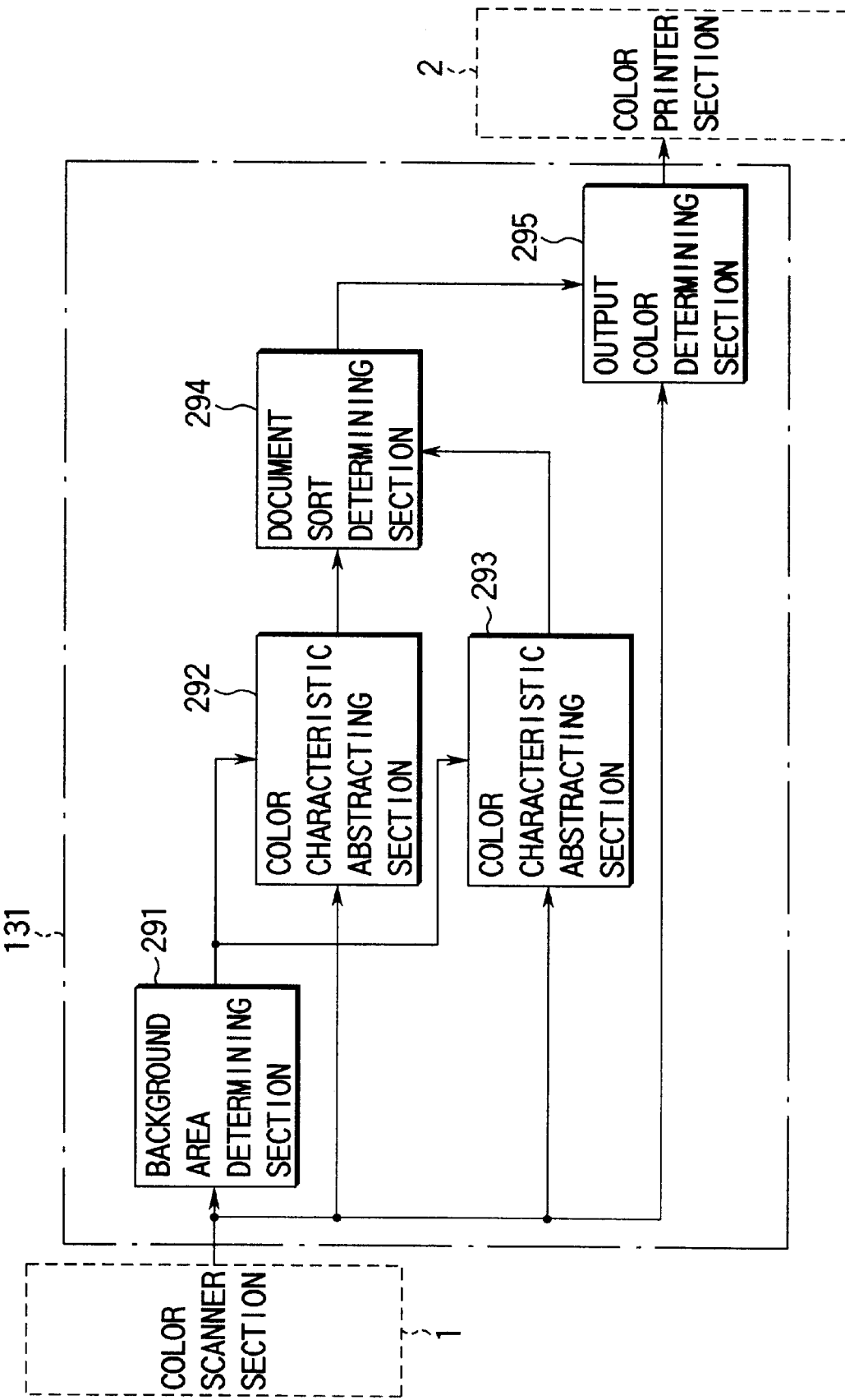
FIG. 28 is a schematic block diagram of the image processor of a seventh embodiment of image forming apparatus according to the invention.

FIG. 28 shows a schematic block diagram of the image processing section 131 of the seventh embodiment. It comprises a background area determining section 291, color characteristic abstracting sections 292, 293, a document sort determining section 294 and a color/monochrome output color determining section 295. Each of the color characteristic abstracting sections 292, 293, the document sort determining section 294 and the color/monochrome output color determining section 295 are identical with the color characteristic abstracting section 141, the color/monochrome determining section 142 and the color/monochrome output color determining section 143 of the first embodiment and hence will not be described here any further.

The background area determining section 291 determines if an attention-attracting area of the image that is being processed is a background area or a non-background area. More specifically, the background area determining section 291 draws a characteristic feature of the image that is being processed from the image data of a local area containing an attention-attracting area. For example, such a characteristic feature (e.g., average density) may indicate that the image data of the local area are specific to a background area or a non-background area. The operation of the background area determining section 291 will be described in greater detail below.

Figure 29:
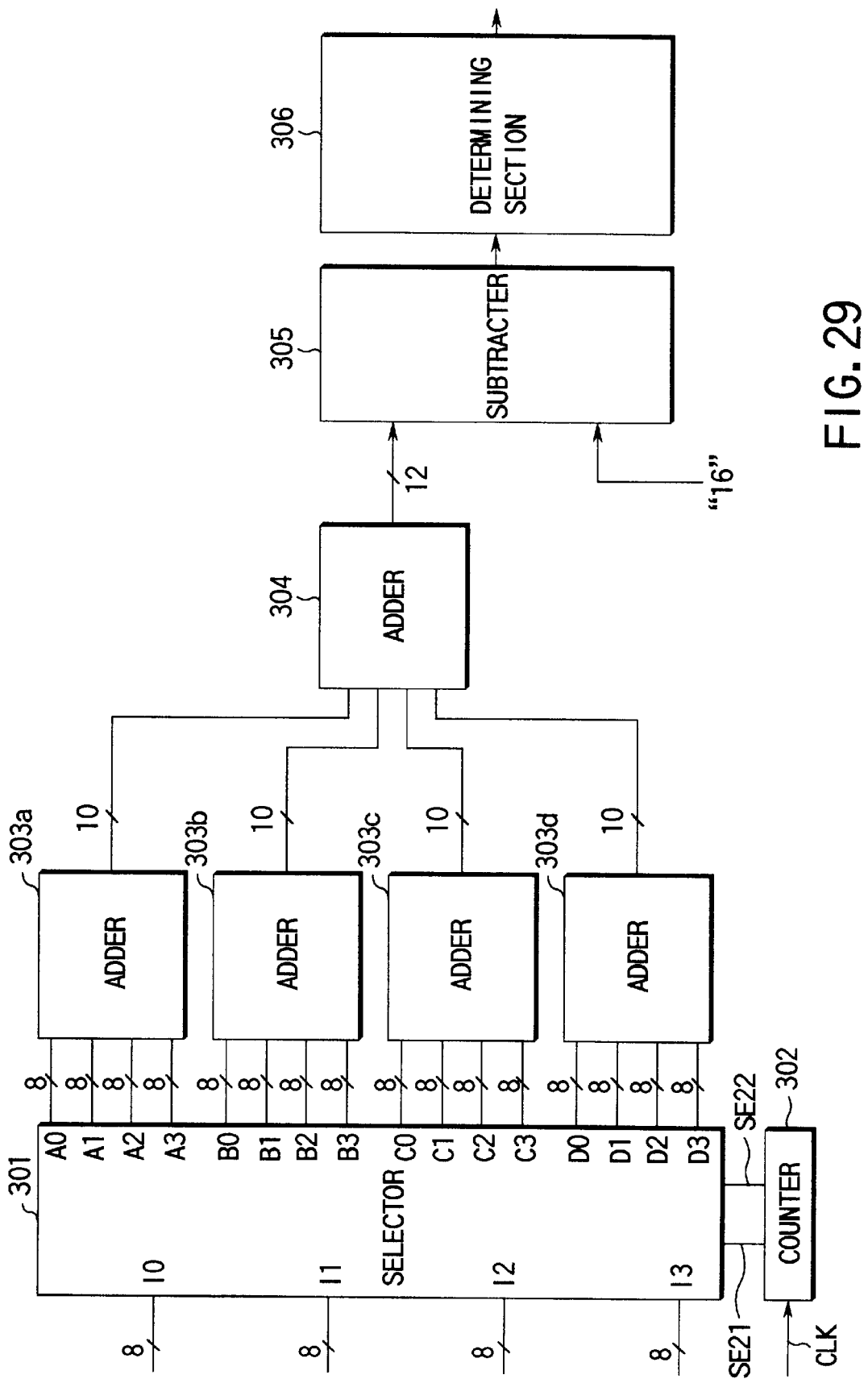
FIG. 29 is a schematic block diagram of the background area determining section of the embodiment of FIG. 28.

Referring to FIG. 25, the background area determining section 291 determines the average value of density in a (4×4) pixel area that contains an attention-attracting pixel (shaded pixel). As shown in FIG. 29, it typically comprises a selector 301, a counter 302, four adders 303a through 303d, an adder 304, a divider 305 and a determining section 306.

The character area determining section 291 operates in a manner as described below. Like the above described character area determining section 271, image data (8 bits/pixel) are sequentially fed to it for the four pixels in every row from a line buffer (not shown) in synchronism with clock pulse CLK and distributed among the adders 303a through 303d by way of the selector 301.

The above distribution of image data fed for the four pixels in every row among the adders 303a through 303d by the selector 301 is controlled by selection signals SE21 and SE22 from the 2-bit counter 302 that operates according to clock pulse CLK.

The adders 303a through 393d add the image data they receives for the four pixels in a row and determines the density and the lowest density of the row. Then, the adder 304 adds the densities obtained by the adders 303a through 303d.

As a result of the above sequence of additions, the sum of the density values for the (4×4) pixel area in FIG. 25 is determined. Then, the divider 305 divides the sum by "16" to obtain the average density of the area.

Thus, the background area determining section 291 determines the average density Da of a (4×4) pixel area containing an attention-attracting pixels as shown in FIG. 25. More specifically, the average value Da is obtained by means of formula 6 below.

$$Da = \sum_{i,j=0}^{3} D_i, j/(4 \times 4) \qquad \text{[formula 6]}$$

Then, the determining section 306 determines if the area is a background area or a non-background area by means of the obtained average density Da and the formulas below, background area: Da<Th2 and non-background area: Da≧Th2 where Th2 is a predetermined threshold value.

Then, the color characteristic abstracting sections 292, 293 extract color characteristics from both the background area and the non-background area determined by the background area determining section 291. Since each of the color characteristic abstracting sections 292 and 293 has a configuration identical with that of the color characteristic abstracting section 141 of the first embodiment, they will not be described here any further for configuration.

Then, the document sort determining section 294 determines if the output should be in color or in black and white from the color information extracted by the color characteristic abstracting sections 292 and 293. The document sort determining section 294 typically comprises a CPU and memories and performs its determining operation by applying the formula 1 above to background areas and non-background areas.

background area=color, non-character area color: full color background area=color, non-background area= monochrome: full color background area=monochrome, non-background area= color: multi-color background area=monochrome, non-background area=monochrome: monochrome Thus, an original carrying having one or more than one colored non-background areas can be copied also in color for that area(s) by using a coloring matter at a minimal rate of consumption at reduced copying cost.

Now, an eighth embodiment of three invention will be described below.

This eighth embodiment is adapted to produce an accurate and clear copy by determining background areas, character areas and picture areas on the original.

Figure 30:
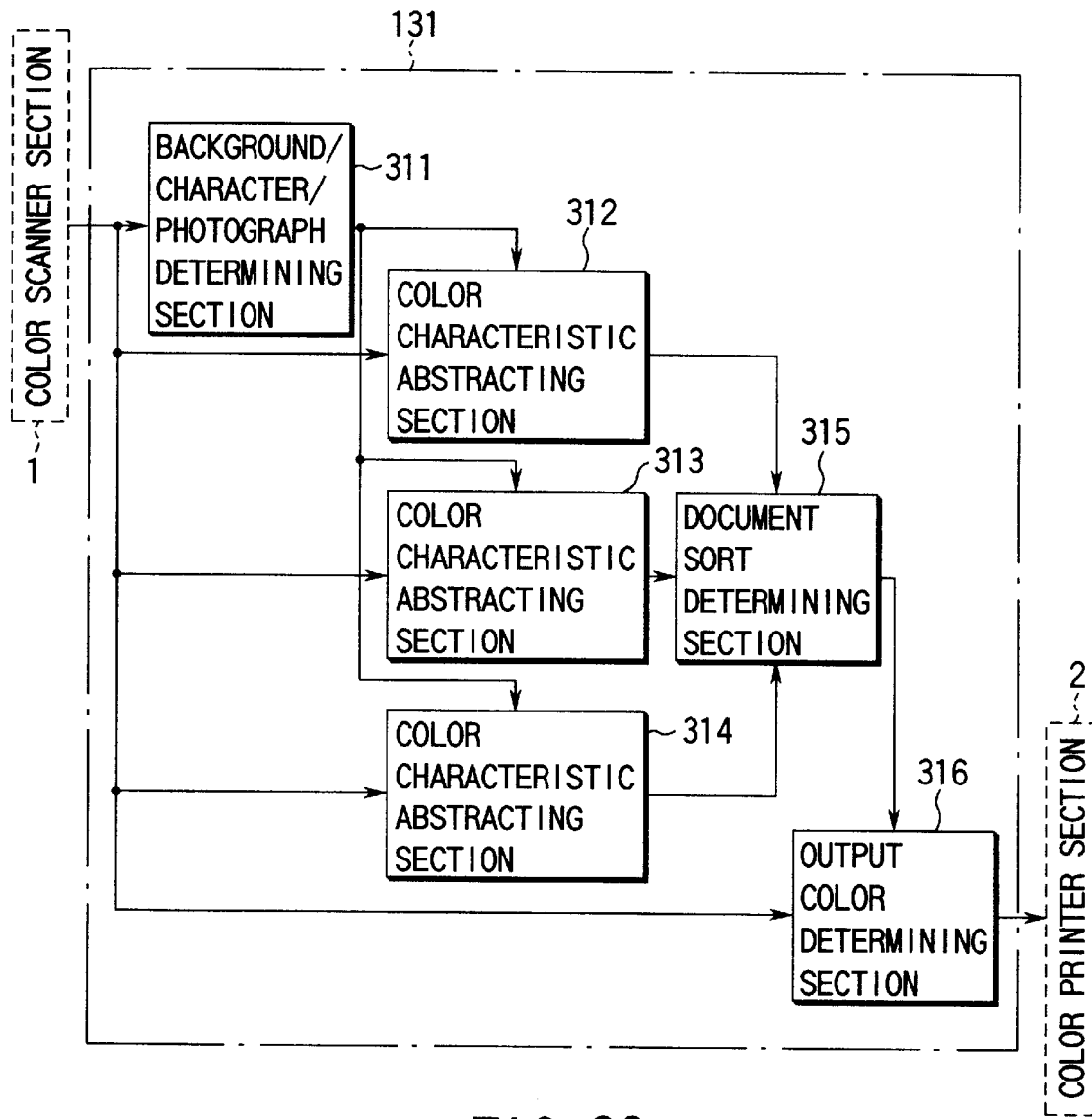
FIG. 30 is a schematic block diagram of the image processor of an eighth embodiment of image forming apparatus according to the invention.

FIG. 30 shows a schematic block diagram of the image processing section 131 of the eighth embodiment. It comprises a background/character/picture area determining section 311, color characteristic abstracting sections 312, 313, 314, a document sort determining section 315 and a color/ monochrome output color determining section 316. Each of the color characteristic abstracting sections 312 through 314, the document sort determining section 315 and the color/ monochrome output color determining section 316 are identical with the color characteristic abstracting section 141, the color/monochrome determining section 142 and the color/ monochrome output color determining section 143 of the first embodiment and hence will not be described here any further.

The background/character/picture area determining section 311 determines if an attention-attracting area of the image that is being processed is a background area, a character area or a picture area. More specifically, the background/character/picture area determining section 311 draws a characteristic feature of the image that is being processed from the image data of a local area containing an attention-attracting area. For example, such a characteristic feature may be the largest density difference as described above by referring to the sixth embodiment or the average density as described above by referring to the seventh embodiment. The operation of the background/character/ picture area determining section 311 will be described in greater detail below.

Figure 31:
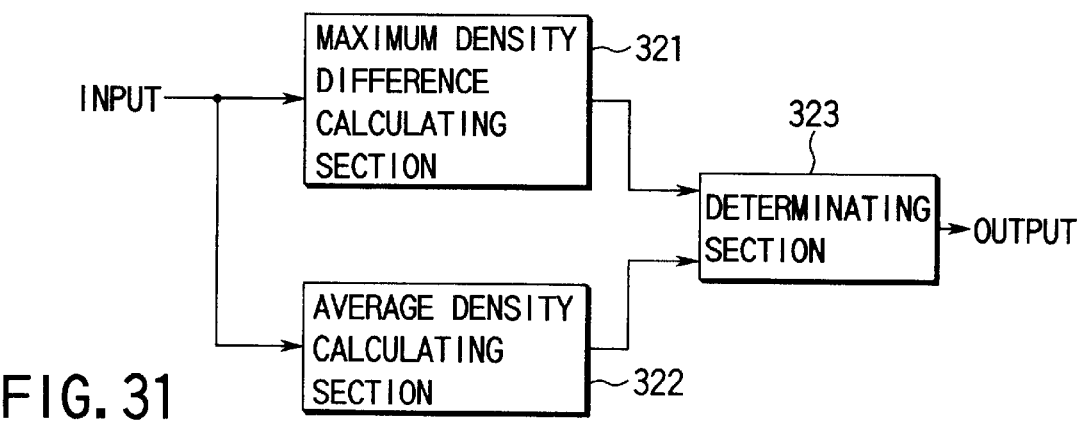
FIG. 31 is a schematic block diagram of the background/character/photograph determining section of the embodiment of FIG. 30.

The background/character/picture area determining section 311 determines the largest density difference ΔDmax and the average density Da in a manner as described above and determines the type of the attention-attracting area on the basis of the largest density difference ΔDmax and the average density Da. It typically comprises a maximum density difference calculating section 321, an average density calculating section 322 and a determining section 323 as shown in FIG. 31.

The maximum density calculating section 321 has a configuration similar to that of the circuit of FIG. 26 from which the determining section 286 is removed. The average density calculating section 322 has a configuration similar to that of the circuit of FIG. 29 from which the determining section 306 is removed. The largest density difference ΔDmax and the average density Da are obtained by the above described respective methods. The determining section 323 determines if the area is a background area, a character area or a picture area in a manner as will be shown below background area: ΔDmax<Th3 & Da<Th4, character area: ΔDmax≧Th3 and picture area: ΔDmax<Th3 & Da≧Th4 where Th3 and Th4 are predetermined threshold values.

Then, the color characteristic abstracting sections 312 through 314 extract color characteristics from each of the background area, the character area and the picture area determined by the background/character/picture area determining section 311. Since each of the color characteristic abstracting sections 312 through 314 has a configuration identical with that of the color characteristic abstracting section 141 of the first embodiment, they will not be described here any further for configuration.

Then, the document sort determining section 315 determines if the output should be in color or in black and white from the color information extracted by the color characteristic abstracting sections 312 through 314. The document sort determining section 315 typically comprises a CPU and memories and performs its determining operation by applying the formula 1 above to background areas and non-background areas.

background area=color, character area=color, picture area=color: full color background area=color, character area=color, picture area=monochrome: multi-color background area=color, character area=monochrome, picture area=color: full color background area=color, character area=monochrome, picture area=monochrome: monochrome background area=monochrome, character area=color, picture area=color: full color background area=monochrome, character area=color, picture area=monochrome: multi-color background area=monochrome, character area=monochrome, picture area=color: full color background area=monochrome, character area=monochrome, picture area=monochrome: monochrome Thus, an original carrying having one or more than one colored character areas can be copied also in color only for that area(s) by using a coloring matter at a minimal rate of consumption at reduced copying cost.

With any of the above described embodiments of an image forming apparatus for copying an original sheet, it determines if the original is to be copied in color or in black and white by pre-scanning the original and analyzing its chromatic distribution and then automatically selects a color mode or a monochrome mode according to the determination before it produces a copy of the original. Thus, an image forming apparatus according to the invention can cope with an original comprising a large number of sheets that are fed by an ADF if the original contains both color monochromatic pictures.

Additionally, an image forming apparatus according to the invention is free from the above pointed out problem of a known image forming apparatus having the feature of automatically selecting a color mode or a monochrome mode that the result of the discrimination made by the apparatus between a picture in color and a picture in black and white for the original to, be copied may not necessarily agree with the intention of the user who may want to obtain a monochromatic copy of a color picture.

For example, a faintly colored sheet carrying thereon characters written with black ink (with a black pencil) may be copied in black and white, if the user wants so, by preselecting an appropriate set of conditions.

Handbills and leaflets prepared by printing letters with black ink on colored sheets of paper may also be copied in black and white.

In other words, an image forming apparatus according to the invention automatically selects a color mode or a monochrome mode according to a set of conditions preselected by the user regardless if the original sheet to be copied is in color or in black and white.

Thus, with an image forming apparatus according to the invention, faintly colored sheets carrying thereon characters written with black ink (with a black pencil) and handbills and leaflets prepared by printing letters with black ink on colored sheets of paper may be copied in black and white to suppress the consumption of costly coloring matters and hence the total cost of producing copies.

Therefore, according to the present invention, there is provided an image forming apparatus that can copy an original by automatically selecting a color mode or a monochrome mode for each sheet of the original if the latter contain pictures in color and those in black and white as well as an image processing apparatus for processing an image picked up by such an image forming apparatus.

Additionally, according to the invention, there is provided an image forming apparatus that can automatically select a color mode or a monochrome mode according to a set of preselected conditions for copying an original without simply depending on if the original is in color or in black and white as well as an image processing apparatus for processing an image picked up by such an image forming apparatus.

Finally, according to the invention, there is provided an image forming apparatus that can produce a black and white copy from an original of a colored sheet carrying thereon characters printed with black ink at low cost as well as an image processing apparatus for processing an image picked up by such an image forming apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color image forming apparatus comprising:

reading means for reading an original and outputting image data including color information;

determining means for determining a background area and a non-background area from the image data read by the reading means;

color recognizing means for recognizing color information for the background area determined by the determining means and color information for the non-background area determined by the determining means;

output color determining means for determining a color material so as to realize image formation with a minimum amount of the color material; and image forming means for forming an image of the background area in the color material determined by the output color determining means different from the color information for the background area when the background area and the non-background area are respectively recognized to be in color and monochrome on the basis of the recognition results of the color recognizing means.

2. A color image forming apparatus according to claim 1, wherein the color recognizing means include:

histogram preparing means for preparing a plurality of histograms for R, G and B with respect to the background area and the non-background area on the basis of the image data read by the reading means; and color information recognizing means for calculating differences among the histograms prepared by the histogram preparing means, and recognizing color information of the image data with respect to the background area and the non-background area on the basis of the differences.

3. A color image forming apparatus according to claim 1, wherein the color recognizing means include:

histogram preparing means for preparing histograms for R, G and B with respect to the background area and the non-background area on the basis of the image data read by the reading means; and determining means for calculating differences among the histograms prepared by the histogram preparing means, and determining whether each of the background area and the non-background area is in white and another color or full color on the basis of the differences.

4. A color image forming apparatus comprising:

reading means for reading an original and outputting image data including color information;

determining means for determining a background area and a non-background area from the image data;

color recognizing means for recognizing color information for the background area determined by the determining means and color information for the non-background area determined by the determining means;

output color determining means for determining a color material so as to realize image formation with minimum color material; and image forming means for forming an image of the background area in the color material determined by the output color determining means different from the color information for the background area and forming an image of the non-background area in monochrome, respectively, when the background area and the non-background area are respectively recognized to be in color and monochrome based on the recognition results of the color recognizing means.

5. A color image forming apparatus according to claim 4, wherein the color recognizing means include:

histogram preparing means for preparing a plurality of histograms for R, G and B with respect to the background area and the non-background area on the basis of the image data read by the reading means; and color information recognizing means for calculating differences among the histograms prepared by the histogram preparing means, and recognizing color information of the image data with respect to the background area and the non-background area on the basis of the differences.

6. A color image forming apparatus according to claim 4, wherein the color recognizing means include:

histogram preparing means for preparing a plurality of histograms for R, G and B with respect to the background area and the non-background area based on the image data read by the reading means; and determining means for calculating differences among the histograms prepared by the histogram preparing means, and determining whether each of the background area and the non-background area is in white and another color or full color.

7. A color image forming apparatus comprising:

reading means for reading an original and outputting image data including color information;

determining means for determining a background area and a non-background area from the image data read by the reading means;

color recognizing means for recognizing color information for the background area determined by the determining means and color information for the non-background area determined by the determining means;

output color determining means for determining a color material which is defined by locations of the peaks for R, G and B respectively from a histogram for the original; and image forming means for forming an image of the background area in the color material determined by the output color determining means different from the color information for the background area when the background area and the non-background area are respectively recognized to be in color and monochrome on the basis of the recognition results of the color recognizing means.

* * * * *